(12) United States Patent
Nagaoka

(10) Patent No.: US 6,252,723 B1
(45) Date of Patent: Jun. 26, 2001

(54) OBJECTIVE OPTICAL SYSTEM

(75) Inventor: Toshiyuki Nagaoka, Hachioji (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 09/260,508

(22) Filed: Mar. 2, 1999

(30) Foreign Application Priority Data

Mar. 3, 1998 (JP) .................................................. 10-066027

(51) Int. Cl.[7] .......................... G02B 15/14; G02B 3/00; G02B 9/00; G02B 27/02; A61B 1/06

(52) U.S. Cl. .................. 359/689; 359/652; 359/661; 359/691; 359/685; 359/686; 359/740; 359/785; 359/786; 359/788; 359/799; 359/800; 600/168; 600/175; 600/176

(58) Field of Search ..................... 359/652–654, 359/661, 676, 690, 685, 686, 691, 738, 740, 785, 786, 788, 799, 800; 600/168, 175, 176

(56) References Cited

U.S. PATENT DOCUMENTS

4,312,572  1/1982  Yasmashita et al. ................. 359/676

FOREIGN PATENT DOCUMENTS

4-218012  8/1992  (JP).
6-317744  11/1994  (JP).

Primary Examiner—Georgia Epps
Assistant Examiner—Evelyn A. Lester
(74) Attorney, Agent, or Firm—Pillsbury Winthrop LLP

(57) ABSTRACT

An objective optical system comprising, in order from the object side, a first lens unit having a positive refractive power, a second lens unit having a negative refractive power and a third lens unit having a positive refractive power, wherein the second lens unit is moved along an optical axis for changing a magnification. This objective optical system is configured to be compact and have favorable optical performance by adequately selecting an airspace between the first lens unit and the second lens unit as well as a power for the first lens unit.

30 Claims, 15 Drawing Sheets

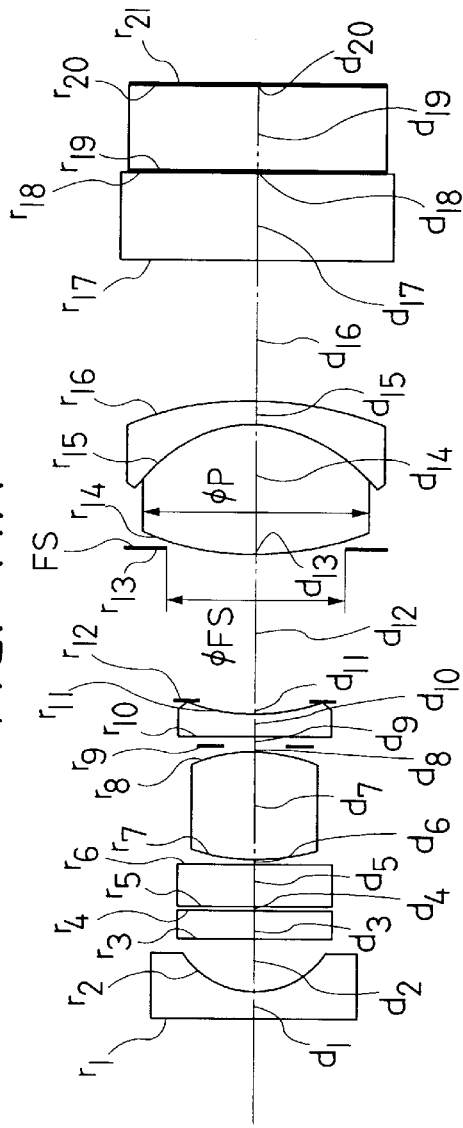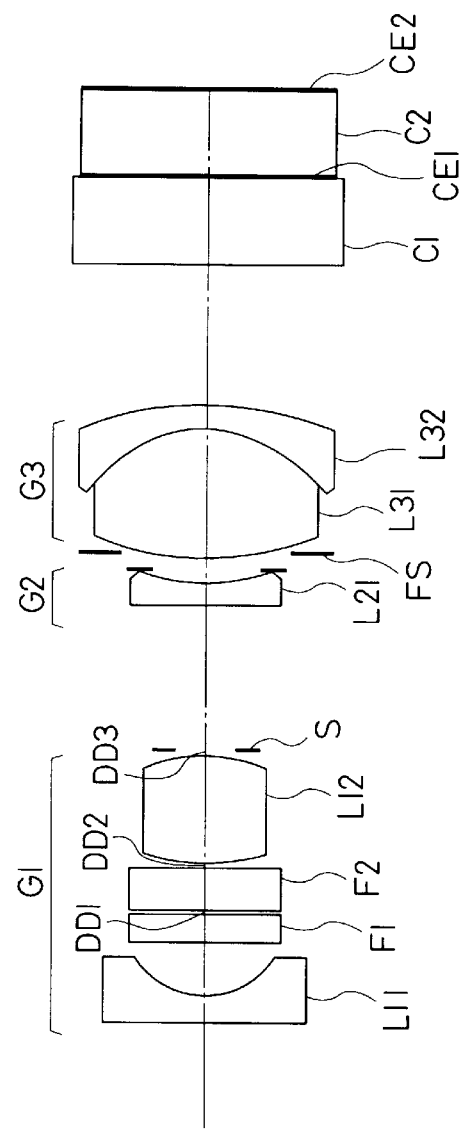

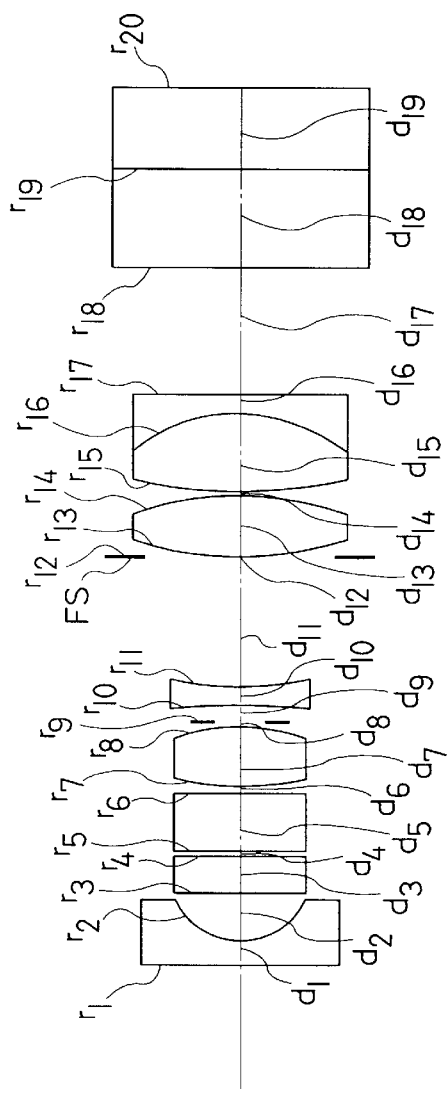
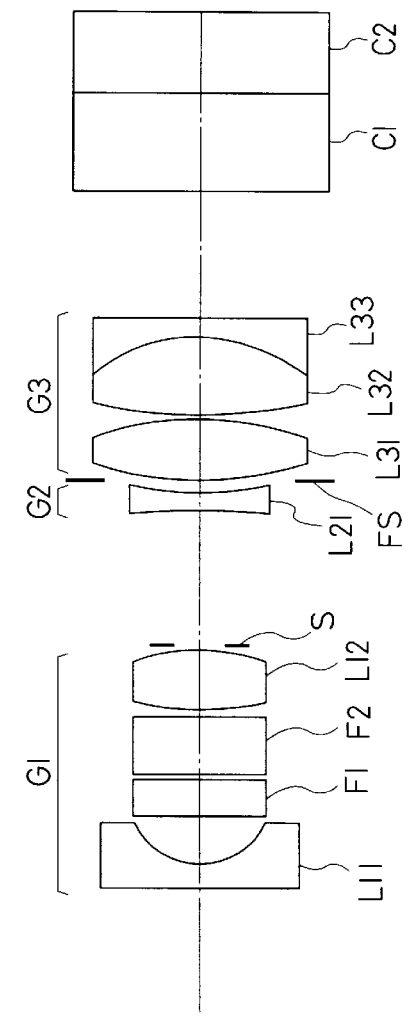
FIG. 13A
FIG. 13B

OBJECTIVE OPTICAL SYSTEM

BACKGROUND OF THE INVENTION a) Field of the Invention

The present invention relates to an objective optical system which has a vari-focal function.

b) Description of the Prior Art

In recent years, there have been demands for endoscopes which permit observation not only of usual images but also of magnified images for precise diagnoses. Furthermore, there have been demands for endoscopes which have non-flexible tips which are short in length and have a small diameter. Accordingly, there have been demands for optical systems for observation of magnified images which have shorter total lengths and smaller outside diameters.

Also in the fields of video cameras and digital cameras, there are demands for lens systems which have shorter total lengths and smaller diameters.

As conventional examples of optical system for observation of magnified images, there are known optical systems disclosed by Japanese Patents Kokoku Publication No. Sho 61-44283, Kokai Publication No. Hei 4-218012 and Kokai Publication No. Hei 6-317744. Each of these conventional examples is a lens system which consists, in order from the object side, of a first lens unit having a positive refractive power, a second lens unit having a negative refractive power and a third lens unit having a positive refractive power, and is configured to perform a vari-focal function by moving the second lens unit along an optical axis.

Since the second lens unit is moved for a long distance for changing a magnification and a diverging light bundle is incident from the second lens unit having the negative refractive power onto a portion of the third lens unit which is remarkably higher than portions of incidence of the other lens units, each of these conventional examples has a defect that it has a large total length and another defect that the third lens unit has a large outside diameter.

SUMMARY OF THE INVENTION

A primary object of the present invention is to provide an objective optical system which comprises, in order from the object side, a first lens unit having a positive refractive power, a second lens unit having a negative refractive power and a third lens unit having a positive refractive power, performs a vari-focal function by moving the second lens unit along an optical axis, and satisfies the following conditions (1) and (2):

$$0.1 < |1/\{f_2(D_W - D_T)\}| < 2 \quad (1)$$

$$1 < |(f_W \cdot f_T)^{1/2}/f_1| < 2 \quad (2)$$

Another object of the present invention is to provide an objective optical system which comprises a plurality of lens units and an aperture stop, wherein at least one of the plurality of lens units is moved along an optical axis for performing a vari-focal function and any of the plurality of lens unit satisfies the following condition (3):

$$0 < H_L/H_S < 0.8 \quad (3)$$

Still another object of the present invention is to provide an objective optical system which comprises, in order from the object side, a first lens unit having a positive refractive power, a second lens unit having a negative refractive power and a third lens unit having a positive refractive power, wherein the second lens unit is moved along an optical axis for performing a vari-focal function, the first lens unit comprises at least one negative lens element and at least one positive lens element, and the third lens unit comprises a negative lens element and at least one positive lens element.

A further object of the present invention is to provide an objective optical system which comprises, in order from the object side, a first lens unit having a positive refractive power, a second lens unit having a negative refractive power and a third lens unit having a positive refractive power, wherein the second lens unit is moved along an optical axis for performing a vari-focal function and the optical system comprises a cemented lens component.

BRIEF DESCRIPTION OF THE DRAWINGS

FIGS. 11A and 11B show sectional views illustrating a composition of an eighth embodiment of the objective optical system according to the present invention;

FIGS. 13A and 13B show sectional views illustrating a composition of a tenth embodiment of the objective optical system according to the present invention;

DETAILED DESCRIPTION OF THE PREFERRED EMBODIMENTS

Figure 1A:
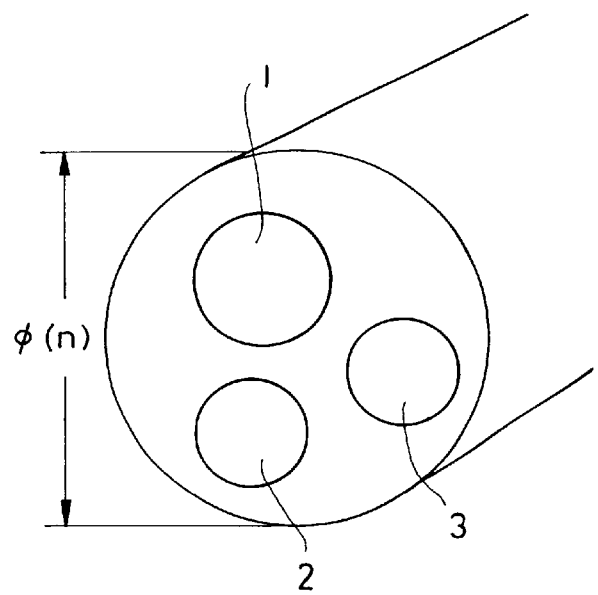
FIGS. 1A and 1B are schematic diagrams showing an outline of a tip of an endoscope.

The objective optical system according to the present invention which has a first composition is characterized in that it comprises, in order from the object side, a first lens unit having a positive refractive power, a second lens unit having a negative refractive power and a third lens unit having a positive refractive power, that the second lens unit is moved along an optical axis for performing a vari-focal function, and that the optical system satisfies the following conditions (1) and (2):

$$0.1<|1/\{f_2(D_W-D_T)\}|<2 \qquad (1)$$

$$1<(f_W \cdot f_T)^{1/2}/f_1<2 \qquad (2)$$

wherein the reference symbols $f_1$ and $f_2$ represent focal lengths of the first lens unit and the second lens unit respectively, the reference symbols $D_W$ and $D_T$ designate airspaces reserved between the first lens unit and the third lens unit at a wide position and a tele position respectively, and the reference symbols $f_W$ and $f_T$ denote focal lengths of the objective optical system as a whole at the wide position and the tele position respectively.

In order to shorten a total length of an optical system, it is generally effective to strengthen refractive powers of lens units and arrange the lens units with narrow airspaces reserved therebetween. Also in case of an optical system which comprises a first positive lens unit, a second negative lens unit and a third positive lens unit, it is desirable for shortening a total length of the optical system to strengthen a refractive power of each of the lens units. In order to shorten a total length of the optical system, it is effective in particular to strengthen a refractive power of the second lens unit so that this lens unit is moved for a shorter distance to change magnification. When a refractive power of the second lens unit is too large, however, this lens unit will produce large aberrations, thereby making it difficult to obtain favorable optical performance.

The objective optical system according to the present invention which satisfies the condition (1) mentioned above is configured to suppress production of aberrations, or maintain aberrations at favorable levels, and permits strengthening a refractive power of the second lens unit while maintaining aberrations at the favorable levels, thereby being capable of having a short total length.

If the lower limit of 0.1 of the condition (1) is exceeded, the second lens unit will have a weak refractive power and a long moving distance, whereby the optical system will have a large total length. If the upper limit of 2 of the condition (1) is exceeded, in contrast, the second lens unit will produce large aberrations and enlarge a Petzval's sum whose value is associated with a refractive power) thereby tilting an image surface in a direction away from the object side.

It is more preferable that the optical system satisfies, in place of the condition (1), the following condition (1-1):

$$0.15<|1/\{f_2(D_W-D_T)\}|<1 \qquad (1-1)$$

In order to shorten a total length of an optical system which comprises a first positive lens unit, a second negative lens unit and a third positive lens unit like the objective optical system according to the present inventions it is effective to strengthen not only a refractive power of the second lens unit but also that of the first lens unit. When a refractive power is greatly strengthened for the first lens unit on which heights of axial and offaxial incident rays are remarkably different between a wide position and a telephoto, or tele position, however, coma will be produced in a large amount at the wide position, at which the offaxial rays are high. At the tele position at which the axial rays are high, spherical aberration in particular will be produced in a large amount and is difficult to correct.

In order to shorten a total length of the optical system by strengthening a refractive power of the first lens unit while suppressing production of aberrations at the wide position and the tele position, the optical system according to the present invention is configured to satisfy the condition (2).

Of the lower limit of 1 of the condition (2) is exceeded, the first lens unit will have a weak refractive power, thereby making it impossible to shorten a total length of the optical system as a whole. If the upper limit of 2 of the condition (2) is exceeded, in contrast, the first lens unit will produce aberrations in amounts too large for correction.

It is desirable that the objective optical system according to the present invention satisfies, in place of the condition (2), the following condition (2-1):

$$1.1<|(f_W \cdot f_T)^{1/2}|/f_1<1.8 \qquad (2-1)$$

Furthermore, the objective optical system according to the present invention is an optical system comprising a plurality of lens units and an aperture stop, performs a vari-focal function by moving at least a lens unit along an optical axis and can have a small diameter without remarkably reducing an amount of marginal rays when any one (not specific one) of the plurality of lens units satisfies the condition (3) mentioned below so as to have a small outside diameter:

$$0<H_U/H_S<0.8 \qquad (3)$$

wherein the reference symbol $H_U$ represents an actual height of an offaxial upper ray at a location of the aperture stop and the reference symbol $H_S$ designates a radius of the aperture stop.

When an optical system is composed, in order from the object side, of a first lens unit having a positive refractive power, a second lens unit having a negative refractive power and a third lens unit having a positive refractive power in particular, offaxial rays are high on the third lens unit having the positive refractive power onto which a diverging light bundle is incident from the second lens unit having a vari-focal function. Accordingly, the third lens unit has a large outside diameter, thereby hindering a lens system from having a small diameter. In order to configure the lens system so as to have a small outside diameter, it is desirable to reduce an outside diameter of the third lens unit. When the outside diameter of the third lens unit is reduced simply, however, a marginal light bundle is shielded, thereby reducing an amount of marginal rays and darkening a marginal portion of an image as compared with a central portion.

In case of an objective optical system for endoscopes which has a wide field angle and produces negative distortion of 30% or larger, however, the optical system has a characteristic that an imaging magnification at a marginal portion is lower than that at a central portion and distortion may be produced in an amount of 40% or larger. Accordingly, the optical system for endoscopes has a characteristic that an amount of rays condensed to an outer circumferential portion is larger than that of rays condensed to the central portion.

By utilizing the characteristics described above, it is possible to reduce an outside diameter of the third lens unit to a degree at which the marginal portion of the image is not extremely darkened.

In order to reduce an outside diameter of the third lens unit to a degree at which the marginal portion of the image is not extremely darkened making the point described above into consideration, it is desirable that the optical system according to the present invention satisfies the condition (3) mentioned above.

The objective optical system according to the present invention which has the composition described above can have a small diameter without reducing an amount of marginal rays when the lens unit mentioned above (a third lens unit in case of the lens system composed of the three positive, negative and positive lens units) satisfies the condition (3) and has a small outside diameter.

If the lower limit of 0 of the condition (3) is exceeded, an amount of marginal rays will be reduced at the wide position, whereby a marginal portion of an image will be darker than a central portion. If the upper limit of 0.8 of the condition (3) is exceeded, in contrast, it will be impossible to sufficiently reduce an outside diameter of the third lens unit.

The effect of reducing a diameter of an optical system by configuring the third lens unit so as to satisfy the condition (3) mentioned above is remarkable for an optical system which has a field angle of 80° or larger at a wide position. The effect of reducing a diameter obtained by satisfying the condition (3) is more remarkable for an optical system which has a field angle of 100° or larger at a wide position.

It is desirable for the optical system according to the present invention to satisfy, in place of the condition (3) mentioned above, the following condition (3-1):

$$0.1 < H_U/H_S < 0.5 \tag{3-1}$$

The above description has been made mainly of a case wherein the optical system according to the present invention is to be used in an endoscope. In a case of an optical system for digital cameras, in contrast, the optical system has a field angle smaller than that of the optical system for endoscopes and produces distortion in an amount which is not problematic for practical use. Though a small amount of distortion may produce a fear of insufficient amount of marginal rays, a reduction condition of marginal rays in the optical system for digital cameras is different from that in the optical system for endoscopes since the optical system for digital cameras is used for photographing objects which are not illuminated with illuminating equipment unlike the optical system for endoscopes. Accordingly, the amount reduction of marginal rays is not problematic for practical use even though an outside diameter is reduced so as to satisfy the condition (3) in the optical system for digital cameras.

For an endoscope using an objective optical system which is composed of a plurality of lens units and performs a vari-focal function by moving at least one lens unit along an optical axis for observing magnified images, it is desirable to minimize an outside diameter of a tip portion in which the objective optical system is disposed.

Figure 1B:
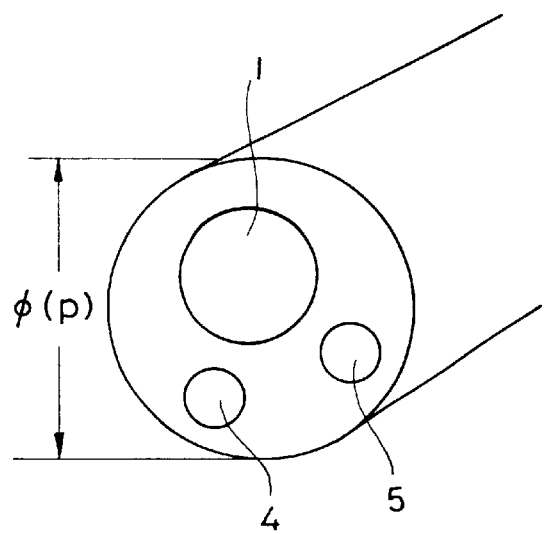

A sections of tip portions of endoscopes are illustrated in FIGS. 1A and 1B, wherein a reference numeral 1 represents an objective optical system, reference numerals 2, 3, 4 and 5 designate illumination optical systems, and reference symbols $\phi(n)$ and $\phi(p)$ denote diameters of the tip portions.

Though it is effective to reduce an outside diameter of the objective optical system 1 for thinning the tip portion as described above, there is another means to reduce outside diameters of the illumination systems. Description will be made of concrete examples of an illumination system having a large outside diameter and an illumination system having a small outside diameter which are shown in FIG. 1A and FIG. 1B respectively. By using the illumination optical systems 4 and 5 which have small diameters, the tip portion of the endoscope shown in FIG. 1A can be reduced so as to have the diameter $\phi(p)$ as shown in FIG. 1B.

Figure 2A:
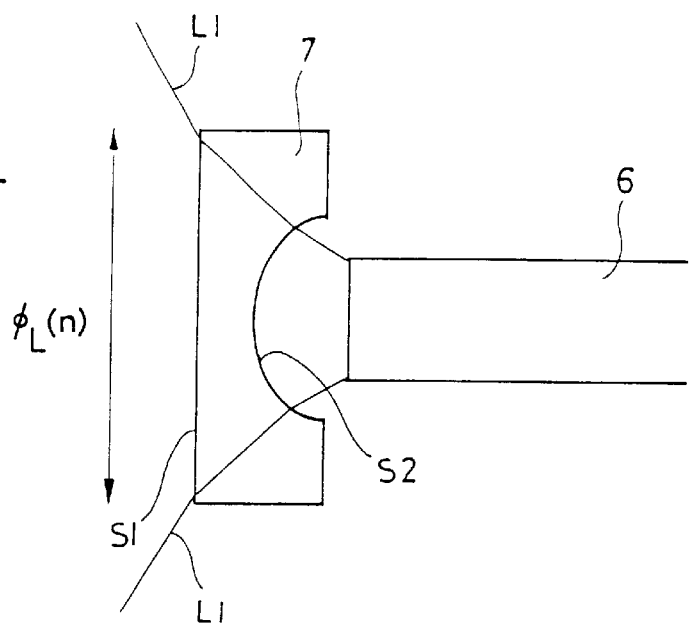
FIGS. 2A and 2B are diagrams exemplifying an illumination optical system for endoscopes.
Figure 2B:
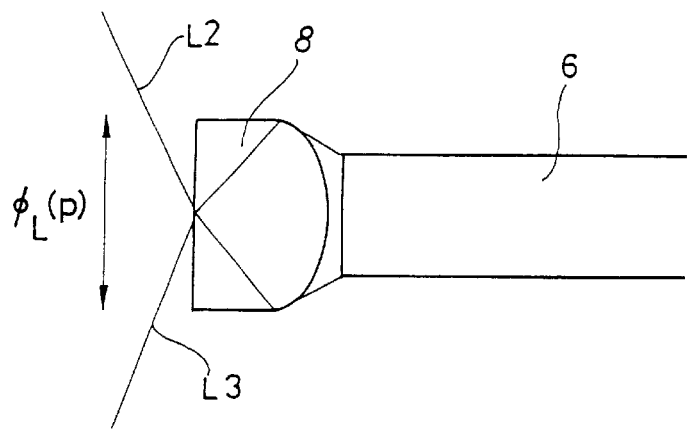

FIGS. 2A and 2B are sectional views exemplifying illumination optical systems. An example using a negative lens component is shown in FIG. 2A, wherein a reference numeral 6 represents a light guide and a reference numeral 7 designates an illumination optical system which comprises a negative lens component. FIG. 2B shows an example of an illumination optical system which uses a positive lens component 8.

In the illumination optical system shown in FIG. 2A out of the examples shown in FIGS. 2A and 2B, rays L1 which emerge from the light guide 6 are made divergent by a surface S2 of the negative lens component 7 on a side of the light guide, whereby an object side surface S1 of the negative lens component 7 must have a sufficiently large effective diameter. Accordingly, this lens component has a large diameter, thereby enlarging the diameter $\phi(n)$ of the tip portion of an endoscope.

In contrast, the illumination optical system which uses the positive lens component 8 as shown in FIG. 2B makes rays L2 and L3 which emerge from the light guide 6 for illuminating an object with these rays. When light guides having the same outside diameter are used, the illumination optical system shown in FIG. 2B permits using a lens component having the outside diameter $\phi_L(P)$ which is smaller than the outside diameter $\phi_L(n)$ of the optical system using the negative lens component. It is therefore desirable to configure at least one illumination system so as to have a positive refractive power. When an optical system comprises a movable lens unit in particular, it requires a moving mechanism, thereby thickening a tip portion of an endoscope. A tip portion of an endoscope can have a small outside diameter by using an illumination optical system which is composed as described above.

It is more desirable that each of at least two illumination optical systems comprises at least one positive lens component. Furthermore, it is desirable that at least two illumination optical systems have positive refractive powers.

In order to shorten a total length of the objective optical system according to the present invention, it is desirable to use a gradient index lens element. Gradient index lens elements have larger freedom for correction of aberrations and permit reducing a number of lens elements to be used in the optical system according to the present invention, thereby making it to possible to configure the optical system more compactly.

An optical system for endoscopes which is configured to observe a magnified image prolongs an object distance for observing a broad range at a wide position and shortens an object distance in addition to a vari-focal function for observation of an image at an enhanced magnified level at a tele position. When an object distance is not adequate at the tele position however, this optical system does not allow the image at a sufficiently enhanced magnification level.

When the objective optical system according to the present invention is to be used for observation at a high magnification, it is desirable to configure it so as to satisfy the following condition (4):

$$0.1 < d_{OT}/f_T < 5 \tag{4}$$

wherein the reference symbol $d_{OT}$ represents an object distance at the tele position and the reference symbol $f_T$ designates a focal length of the optical system as a whole at the tele position.

If the upper limit of 5 of the condition (4) is exceeded, it will be difficult to obtain a sufficiently high magnification level. If the lower limit of 0.1 of the condition (4) is exceeded, in contrast, an object distance will be too short to allow illumination rays to sufficiently cover an observation range.

It is desirable to satisfy, in place of the condition (4), the following condition (4-1):

$$0.2 < d_{OT}/f_T < 3 \tag{4-1}$$

It is more desirable to satisfy, in place of the condition (4) or the condition (4-1), the following condition (4-2):

$$0.5 < d_{OT}/f_T < 1.5 \tag{4-2}$$

The objective optical system according to the present invention which has a third composition comprises, in order from the object side, a first lens unit having a positive refractive power, a second lens unit having a negative refractive power and a third lens unit having a positive refractive power, wherein the optical system performs a vari-focal function by moving the second lens unit along an optical axis, the first lens unit comprises a negative lens element and at least a positive lens element, and the third lens unit comprises a negative lens element and at least a positive lens element.

In order to compose the optical system of a smaller number of lens elements and correct aberrations favorably, it is desirable that the first lens unit on which offaxial rays are high and which produces offaxial aberrations in large amounts is composed of a negative lens element and at least a positive lens element. In order to compose the third lens unit which mainly has an imaging function and produces spherical aberration in a relatively large amount of a small number of lens elements, it is desirable to compose the lens unit of a negative lens element and at least a positive lens element.

The optical system according to the present invention which has a fourth composition comprises, in order from the object side, a first lens unit having a positive refractive power, a second lens unit having a negative refractive power and a third lens unit having a positive refractive power, and is characterized in that the optical system changes a magnification by moving the second lens unit along an optical axis and comprises a cemented lens component.

The objective optical system according to the present invention which has a wide field angle tends to produce chromatic aberration in a large amount. In order to correct chromatic aberration with a lens system which can be manufactured at a low cost, it is desirable to use a pair of cemented lens components. When priority is to be placed not on a manufacturing cost but on correction of chromatic aberration, it is desirable to use two pairs of cemented lens components.

The optical system according to the present invention which has the fourth composition comprises, from the object side, the first lens unit having the positive refractive power, the second lens unit having the negative refractive power and the third lens unit having a positive lens unit, wherein the optical system performs a vari-focal function by moving the second lens unit along the optical axis, wherein the first lens unit comprises, in order from the object side, a negative lens element, a plane parallel plate, at least an optical element and an aperture stop, and wherein the optical element disposed between the plane parallel plate and the aperture stop satisfies the following condition (5):

$$DDi < 0.2 \text{ mm} \tag{5}$$

wherein the reference symbol DDi represents an airspace reserved between the optical elements disposed between the plane parallel plate and the aperture stop (between each optical element and a preceding or following optical element).

Figure 3:
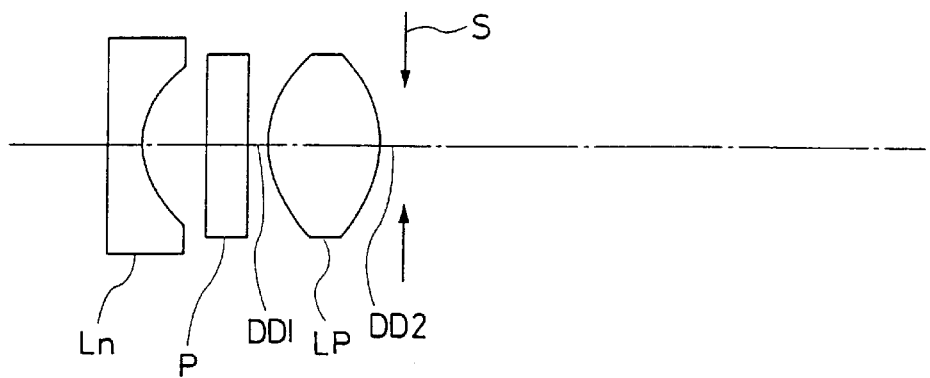
FIG. 3 shows a sectional view exemplifying a first lens unit of the objective optical system according to the present invention.

When the first lens unit is composed, in order from the object side, of a negative lens element Ln, a plane parallel plate P, an optical element LP and a stop S as shown in FIG. 3, it is desirable that at least either of airspaces DD1 and DD2 before and after the optical element disposed between the plane parallel plate P and the stop S satisfies the condition (5) mentioned above so that the optical system can have a short total length. When the condition (5) is satisfied, a distance between a first lens component Ln and the stop S can be shortened, heights of offaxial rays passing through the first lens component Ln can be lowered and an outside diameter of the first lens component Ln can be reduced, whereby the optical system can be configured compact.

When an optical system is to have a wide field angle no less than 120°, it is desirable that the optical system comprises, in order from the object side, a first lens unit having a positive refractive power, a second lens unit having a negative refractive power and a third lens unit having a positive refractive power, and changes a magnification by moving the second lens unit along an optical axis like the optical system according to the present invention.

Offaxial aberrations can hardly be corrected in an optical system which has a wide field angle not less than 120°. In order to correct offaxial aberrations favorably, it is desirable to compose an objective optical system, in order from the object side, of a positive lens unit, a negative lens unit and a positive lens unit so that the optical system has a symmetrical power distribution.

It is desirable that the optical system which has each of the compositions described above satisfies the conditions (1) and (2) described above.

Furthermore, it is desirable that the objective optical system according to the present invention which has each of the compositions described above satisfies the condition (3) or the conditions (1), (2), (3).

It is more desirable to satisfy the condition (1-1) and the condition (2-1) described above in place of the condition (1) and the condition (2) respectively.

Furthermore, it is more desirable to satisfy the condition (3-1) mentioned above in place of the condition (3).

In order to configure more compact the objective optical system according to the present invention which has each of the compositions described above, it is more desirable to satisfy, in place of the condition (4), (4-1) or (4-2), the following condition (4-3):

$$0.75 < d_{OT}/f_T < 1.5 \tag{4-3}$$

Now, the preferred embodiment of the objective optical system according to the present invention will be described in numerical data shown below:

Embodiment 1
f = 1.49~2.94, F/6.7~17.6, 2ω = 113°~35.7°
object distance = 14~2.5, image height = 1.205

| | | | |
|---|---|---|---|
| $r_1 = \infty$ | | | |
| | $d_1 = 0.4000$ | $n_1 = 1.88300$ | $v_1 = 40.78$ |
| $r_2 = 0.9925$ | | | |
| | $d_2 = 0.6239$ | | |
| $r_3 = \infty$ | | | |
| | $d_3 = 0.6200$ | $n_2 = 1.51633$ | $v_2 = 64.14$ |
| $r_4 = \infty$ | | | |
| | $d_4 = 0.0300$ | | |
| $r_5 = \infty$ | | | |
| | $d_5 = 0.4000$ | $n_3 = 1.51633$ | $v_3 = 64.14$ |
| $r_6 = \infty$ | | | |
| | $d_6 = 0.2000$ | | |
| $r_7 = \infty$ | | | |
| | $d_7 = 0.3000$ | $n_4 = 1.84666$ | $v_4 = 23.78$ |
| $r_8 = 2.2520$ | | | |
| | $d_8 = 0.7000$ | $n_5 = 1.51742$ | $v_5 = 52.43$ |
| $r_9 = -2.2520$ | | | |
| | $d_9 = 0.0500$ | | |
| $r_{10} = 4.0594$ | | | |
| | $d_{10} = 1.0635$ | $n_6 = 1.60342$ | $v_6 = 38.03$ |
| $r_{11} = -2.5841$ | | | |
| | $d_{11} = 0.0500$ | | |
| $r_{12} = \infty$ (stop) | | | |
| | $d_{12} = D_1$ (variable) | | |
| $r_{13} = -3.5618$ | | | |
| | $d_{13} = 0.3500$ | $n_7 = 1.88300$ | $v_7 = 40.76$ |
| $r_{14} = 3.5618$ | | | |
| | $d_{14} = D_2$ (variable) | | |
| $r_{15} = -42.9033$ | | | |
| | $d_{15} = 0.7420$ | $n_8 = 1.72916$ | $v_8 = 54.68$ |
| $r_{16} = -3.9283$ | | | |
| | $d_{16} = 0.0500$ | | |
| $r_{17} = 3.9283$ | | | |
| | $d_{17} = 0.7420$ | $n_9 = 1.72916$ | $v_9 = 54.68$ |
| $r_{18} = 42.9033$ | | | |
| | $d_{18} = 0.5016$ | | |
| $r_{19} = -6.1532$ | | | |
| | $d_{19} = 0.3000$ | $n_{10} = 1.84666$ | $v_{10} = 23.78$ |
| $r_{20} = 6.1532$ | | | |
| | $d_{20} = 0.8660$ | $n_{11} = 1.74100$ | $v_{11} = 52.64$ |
| $r_{21} = -9.1990$ | | | |
| | $d_{21} = 3.9444$ | | |
| $r_{22} = \infty$ | | | |
| | $d_{22} = 2.8000$ | $n_{12} = 1.51633$ | $v_2 = 64.14$ |
| $r_{23} = \infty$ | | | |
| | $d_{23} = 0.7000$ | $n_{13} = 1.51633$ | $v_{13} = 64.14$ |
| $r_{24} = \infty$ | | | |

| | | |
|---|---|---|
| f | 1.49 | 2.94 |
| $D_0$ | 14.0000 | 2.5000 |
| $D_1$ | 0.35000 | 2.39649 |
| $D_2$ | 2.54649 | 0.50000 |

$|1/\{f(D_W - D_T)\}| = 0.25$
$|(f_W \cdot f_T)^{1/2}/f_1| = 1.37$, $H_U/H_S = 0.19$,
$d_{OT}/f_T = 0.85$, $\beta_{2W} = 0.78$

Embodiment 2
f = 1.59~2.65, F/7.1~16.6, 2ω = 113.6°~37.7°
object distance = 14~2.5, image height = 1.2

| | | | |
|---|---|---|---|
| $r_1 = \infty$ | | | |
| | $d_1 = 0.4000$ | $n_1 = 1.88300$ | $v_1 = 40.78$ |
| $r_2 = 0.8683$ | | | |
| | $d_2 = 0.5046$ | | |
| $r_3 = \infty$ | | | |
| | $d_3 = 0.6200$ | $n_2 = 1.51633$ | $v_2 = 64.14$ |
| $r_4 = \infty$ | | | |
| | $d_4 = 0.0300$ | | |
| $r_5 = \infty$ | | | |
| | $d_5 = 0.4000$ | $n_3 = 1.51633$ | $v_3 = 64.14$ |
| $r_6 = \infty$ | | | |
| | $d_6 = 0.2545$ | | |
| $r_7 = 1.2262$ | | | |
| | $d_7 = 0.5702$ | $n_4 = 1.90135$ | $v_4 = 31.55$ |
| $r_8 = 0.6244$ | | | |
| | $d_8 = 0.8714$ | $n_5 = 1.58913$ | $v_5 = 61.14$ |
| $r_9 = -1.4901$ | | | |
| | $d_9 = 0.0500$ | | |
| $r_{10} = \infty$ (stop) | | | |
| | $d_{10} = D_1$ (variable) | | |
| $r_{11} -2.1064$ | | | |
| | $d_{11} = 0.3500$ | $n_6 = 1.88300$ | $v_6 = 40.76$ |
| $r_{12} = 5.4229$ | | | |
| | $d_{12} D_2$ (variable) | | |
| $r_{13} = 8.2464$ | | | |
| | $d_{13} = 0.7638$ | $n_7 = 1.77250$ | $v_7 = 49.60$ |
| $r_{14} = -4.2025$ | | | |
| | $d_{14} = 0.1000$ | | |
| $r_{15} = 3.5102$ | | | |
| | $d_{15} = 0.9246$ | $n_8 = 1.65160$ | $v_8 = 58.55$ |
| $r_{16} = \infty$ | | | |
| | $d_{16} = 0.4526$ | | |
| $r_{17} = -4.4938$ | | | |
| | $d_{17} = 0.3000$ | $n_9 = 1.84666$ | $v_9 = 23.78$ |
| $r_{18} = 4.9157$ | | | |
| | $d_{18} = 0.7487$ | $n_{10} = 1.54072$ | $v_{10} = 47.23$ |
| $r_{19} = -5.4931$ | | | |
| | $d_{19} = 1.9510$ | | |
| $r_{20} = \infty$ | | | |
| | $d_{20} = 2.0000$ | $n_{11} = 1.51633$ | $v_{11} = 64.14$ |
| $r_{21} = \infty$ | | | |
| | $d_{21} = 0.7000$ | $n_{12} = 1.51633$ | $v_{12} = 64.14$ |
| $r_{22} = \infty$ | | | |

| | | |
|---|---|---|
| f | 1.59 | 2.65 |
| $D_0$ | 14.0000 | 2.5000 |
| $D_1$ | 0.35000 | 1.92319 |
| $D_2$ | 2.07319 | 0.50000 |

$|1/\{f_2(D_W - D_T)\}| = 0.38$
$|(f_W \cdot f_T)^{1/2}/f_1| = 1.32$, $H_U/H_S = 0/12$,
$d_{OT}/f_T = 0/95$, $\beta_{2W} = 0.94$

Embodiment 3
f = 1.03~2.13, F/6.3~19.2, 2ω = 113.1°~29.7°
object distance = 9~2, image height = 0.8

| | | | |
|---|---|---|---|
| $r_1 = \infty$ | | | |
| | $d_1 = 0.3000$ | $n_1 = 1.88300$ | $v_1 = 40.78$ |
| $r_2 = 0.7695$ | | | |
| | $d_2 = 0.5457$ | | |
| $r_3 = \infty$ | | | |
| | $d_3 = 0.6200$ | $n_2 = 1.51400$ | $v_2 = 75.00$ |
| $r_4 = \infty$ | | | |
| | $d_4 = 0.0300$ | | |
| $r_5 = \infty$ | | | |
| | $d_5 = 0.4000$ | $n_3 = 1.52287$ | $v_3 = 59.89$ |
| $r_6 = \infty$ | | | |
| | $d_6 = 0.1000$ | | |
| $r_7 = 4.5121$ | | | |
| | $d_7 = 1.3697$ | $n_4 = 1.51633$ | $v_4 = 64.14$ |
| $r_8 = -2.0089$ | | | |
| | $d_8 = 0.0500$ | | |
| $r_9 = 2.4698$ | | | |
| | $d_9 = 0.5000$ | $n_5 = 1.51633$ | $v_5 = 64.14$ |

-continued

Embodiment 3
f = 1.03~2.13, F/6.3~19.2, 2ω = 113.1°~29.7°
object distance = 9~2, image height = 0.8

| | | | |
|---|---|---|---|
| $r_{10} = -5.1287$ | | | |
| | $d_{10} = 0.0300$ | | |
| $r_{11} = \infty$ (stop) | | | |
| | $d_{11} = D_1$ (variable) | | |
| $r_{12} = -1.6604$ | | | |
| | $d_{12} = 0.3000$ | $n_6 = 1.88300$ | $v_6 = 40.76$ |
| $r_{13} = 3.1025$ | | | |
| | $d_{13} = D_2$ (variable) | | |
| $r_{14} = 11.3617$ | | | |
| | $d_{14} = 0.6000$ | $n_7 = 1.88300$ | $v_7 = 40.76$ |
| $r_{15} = -3.8018$ | | | |
| | $d_{15} = 0.1000$ | | |
| $r_{16} = 1.9815$ | | | |
| | $d_{16} = 0.7000$ | $n_8 = 1.51633$ | $v_8 = 64.14$ |
| $r_{17} = -2.8011$ | | | |
| | $d_{17} = 0.1928$ | | |
| $r_{18} = -2.2197$ | | | |
| | $d_{18} = 0.2997$ | $n_9 = 1.84666$ | $v_9 = 23.78$ |
| $r_{19} = 36.2030$ | | | |
| | $d_{19} = 2.6936$ | | |
| $r_{20} = \infty$ | | | |
| | $d_{20} = 2.0000$ | $n_{10} = 1.51633$ | $v_{10} = 64.14$ |
| $r_{21} = \infty$ | | | |
| | $d_{21} = 0.5000$ | $n_{11} = 1.51633$ | $v_{11} = 64.14$ |
| $r_{22} = \infty$ | | | |

| | | |
|---|---|---|
| f | 1.03 | 2.13 |
| $D_0$ | 9.0000 | 2.0000 |
| $D_1$ | 0.20000 | 1.61610 |
| $D_2$ | 1.71610 | 0.30000 |

$|1/\{f_2(D_W - D_T)\}| = 0.59$
$|(f_W \cdot f_T)^{1/2}/f_1| = 1.48$, $H_U/H_S = 0.28$,
$d_{OT}/f_T = 0.94$, $\beta_{2W} = 0.68$

Embodiment 4
f = 1.87~2.46, F/8.4~17.2, 2ω = 114°~12.1°
object distance = 14~2.4, image height = 1.205

| | | | |
|---|---|---|---|
| $r_1 = \infty$ | | | |
| | $d_1 = 0.4000$ | $n_1 = 1.88300$ | $v_1 = 40.78$ |
| $r_2 = 0.8962$ | | | |
| | $d_2 = 0.5558$ | | |
| $r_3 = \infty$ | | | |
| | $d_3 = 0.6200$ | $n_2 = 1.51633$ | $v_2 = 64.14$ |
| $r_4 = \infty$ | | | |
| | $d_4 = 0.0300$ | | |
| $r_5 = \infty$ | | | |
| | $d_5 = 0.4000$ | $n_3 = 1.51633$ | $v_3 = 64.14$ |
| $r_6 = \infty$ | | | |
| | $d_6 = 0.0500$ | | |
| $r_7 = 1.7480$ | | | |
| | $d_7 = 0.6384$ | $n_4 = 1.85026$ | $v_4 = 32.29$ |
| $r_8 = 1.1023$ | | | |
| | $d_8 = 1.3177$ | $n_5 = 1.51633$ | $v_5 = 64.14$ |
| $r_9 = -2.2516$ | | | |
| | $d_9 = 0.0500$ | | |
| $r_{10} = 5.0089$ | | | |
| | $d_{10} = 0.2999$ | $n_6 = 1.81600$ | $v_8 = 46.62$ |
| $r_{11} = 1.7427$ | | | |
| | $d_{11} = 0.9000$ | $n_7 = 1.51633$ | $v_7 = 64.14$ |
| $r_{12} = -4.2864$ | | | |
| | $d_{12} = 0.0500$ | | |
| $r_{13} = 6.1780$ | | | |
| | $d_{13} = 0.5000$ | $n_8 = 1.51633$ | $v_8 = 64.14$ |
| $r_{14} = 20.6106$ | | | |
| | $d_{14} = D_1$ (variable) | | |

-continued

Embodiment 4
f = 1.87~2.46, F/8.4~17.2, 2ω = 114°~12.1°
object distance = 14~2.4, image height = 1.205

| | | | |
|---|---|---|---|
| $r_{15} = $ (stop) | | | |
| | $d_{15} = 0.1000$ | | |
| $r_{16} = -4.7731$ | | | |
| | $d_{16} = 0.3000$ | $n_9 = 1.88300$ | $v_9 = 40.76$ |
| $r_{17} = 2.2863$ | | | |
| | $d_{17} = D_2$ (variable) | | |
| $r_{18} = 8.4983$ | | | |
| | $d_{18} = 0.9000$ | $n_{10} = 1.54072$ | $v_{10} = 47.23$ |
| $r_{19} = -4.1683$ | | | |
| | $d_{19} = 0.0500$ | | |
| $r_{20} = 5.0624$ | | | |
| | $d_{20} = 0.8000$ | $n_{11} = 1.51633$ | $v_{11} = 64.14$ |
| $r_{21} = 26.5610$ | | | |
| | $d_{21} = 0.0500$ | | |
| $r_{22} = 2.8523$ | | | |
| | $d_{22} = 1.7156$ | $n_{12} = 1.51633$ | $v_{12} = 64.14$ |
| $r_{23} = -4.2658$ | | | |
| | $d_{23} = 0.4580$ | $n_{13} = 1.94666$ | $v_{13} = 23.78$ |
| $r_{24} = 3.6816$ | | | |
| | $d_{24} = 3.1035$ | | |
| $r_{25} = \infty$ | | | |
| | $d_{25} = 2.0000$ | $n_{14} = 1.51633$ | $v_{14} = 64.14$ |
| $r_{26} = \infty$ | | | |
| | $d_{26} = 0.7000$ | $n\ = 1.51633$ | $v_{15} = 64.14$ |
| $r_{27} = \infty$ | | | |

| | | |
|---|---|---|
| f | 1.87 | 2.46 |
| $D_0$ | 14.0000 | 2.4000 |
| $D_1$ | 0.30000 | 3.08339 |
| $D_2$ | 3.08339 | 0.30000 |

$|1/\{f_2(D_W - D_T)\}| = 0.21$
$|(f_W \cdot f_T)^{1/2}/f_1| = 1.14$, $H_U/H_S = 0.11$,
$d_{OT}/f_T = 0.97$, $\beta_{2W} = 0.69$

Embodiment 5
f = 1.07~1.70, F/7.2~11.4, 2ω = 113.5°~32.9°
object distance = 9~2, image height = 0.8

| | | | |
|---|---|---|---|
| $r_1 = \infty$ | | | |
| | $d_1 = 0.3000$ | $n_1 = 1.88300$ | $v_1 = 40.78$ |
| $r_2 = 0.5012$ | | | |
| | $d_2 = 0.6125$ | | |
| $r_3 = \infty$ | | | |
| | $d_3 = 0.9539$ | $n_2 = 1.61800$ | $v_2 = 63.33$ |
| $r_4 = -1.1459$ | | | |
| | $d_4 = 0.0500$ | | |
| $r_5 = 2.6528$ | | | |
| | $d_5 = 0.5000$ | $n_3 = 1.51633$ | $v_3 = 64.14$ |
| $r_6 = -2.7819$ | | | |
| | $d_6 = D_1$ (variable) | | |
| $r_7 = \infty$ (stop) | | | |
| | $d_7 = 0.1000$ | | |
| $r_8 = -2.4333$ | | | |
| | $d_8 = 0.3000$ | $n_4 = 1.88300$ | $v_4 = 40.76$ |
| $r_9 = 1.6593$ | | | |
| | $d_9 = D_2$ (variable) | | |
| $r_{10} = 1.2526$ (aspherical surface) | | | |
| | $d_{10} = 0.7000$ | $n_5 = 1.88300$ | $v_5 = 40.76$ |
| $r_{11} = -2.1707$ | | | |
| | $d_{11} = 0.1757$ | | |
| $r_{12} = -1.6001$ | | | |
| | $d_{12} = 0.2995$ | $n_6 = 1.84666$ | $v_6 = 23.78$ |
| $r_{13} = 3.5760$ | | | |
| | $d_{13} = 0.2000$ | | |

-continued

Embodiment 5
f = 1.07~1.70, F/7.2~11.4, 2ω = 113.5°~32.9°
object distance = 9~2, image height = 0.8

| | | | |
|---|---|---|---|
| $r_{14} = \infty$ | | | |
| | $d_{14} = 0.6200$ | $n_7 = 1.51400$ | $v_7 = 75.00$ |
| $r_{15} = \infty$ | | | |
| | $d_{15} = 0.0300$ | | |
| $r_{16} = \infty$ | | | |
| | $d_{16} = 0.4000$ | $n_8 = 1.52287$ | $v_8 = 59.89$ |
| $r_{17} = \infty$ | | | |
| | $d_{17} = 1.1229$ | | |
| $r_{18} = \infty$ | | | |
| | $d_{18} = 1.2000$ | $n_9 = 1.51633$ | $v_9 = 64.14$ |
| $r_{19} = \infty$ | | | |
| | $d_{19} = 0.5000$ | $n_{10} = 1.51633$ | $v_{10} = 64.14$ |
| $r_{20} = \infty$ | | | | aspherical surface coefficient
$A_4 = -8.6636 \times 10^{-2}, A_6 = -3.4303 \times 10^{-2}$

| | | |
|---|---|---|
| f | 1.07 | 1.70 |
| $D_0$ | 9.0000 | 2.0000 |
| $D_1$ | 0.20000 | 1.20746 |
| $D_2$ | 1.30746 | 0.30000 |

$|1/\{f_2(D_W - D_T)\}| = 0.92$
$|(f_W \cdot f_T)^{1/2}/F_1| = 1.45, H_U/H_S = 0.16,$
$d_{OT}/f_T = 1.18, \beta_{2W} = 0.79$ Embodiment 6
f = 1.50~2.61, F/7.1~17.7, 2ω = 113.1°~37.2°
object distance = 13.4~2.35, image height = 1.205

| | | | |
|---|---|---|---|
| $r_1 = \infty$ | | | |
| | $d_1 = 0.3500$ | $n_1 = 1.88300$ | $v_1 = 40.78$ |
| $r_2 = 1.0553$ | | | |
| | $d_2 = 0.9677$ | | |
| $r_3 = \infty$ | | | |
| | $d_3 = 0.6200$ | $n_2 = 1.51400$ | $v_2 = 75.00$ |
| $r_4 = \infty$ | | | |
| | $d_4 = 0.0300$ | | |
| $r_5 = \infty$ | | | |
| | $d_5 = 0.4000$ | $n_3 = 1.52287$ | $v_3 = 59.89$ |
| $r_6 = \infty$ | | | |
| | $d_6 = 0.1000$ | | |
| $r_7 = \infty$ | | | |
| | $d_7 = 2.6391$ | $n_4$ (gradient index lens element) | |
| $r_8 = -2.6614$ | | | |
| | $d_8 = 0.1000$ | | |
| $r_9 = \infty$ (stop) | | | |
| | $d_9 = D_1$ (variable) | | |
| $r_{10} = -4.1954$ | | | |
| | $d_{10} = 0.3500$ | $n_5 = 1.88300$ | $v_5 = 40.76$ |
| $r_{11} = 4.2915$ | | | |
| | $d_{11} = D_2$ (variable) | | |
| $r_{12} = 4.4231$ | | | |
| | $d_{12} = 0.9000$ | $n_6 = 1.51633$ | $v_6 = 64.14$ |
| $r_{13} = -3.8049$ | | | |
| | $d_{13} = 0.0500$ | | |
| $r_{14} = 3.6296$ | | | |
| | $d_{14} = 1.0000$ | $n_7 = 1.51633$ | $v_7 = 64.14$ |
| $r_{15} = -6.0097$ | | | |
| | $d_{15} = 0.2818$ | | |
| $r_{16} = -3.3067$ | | | |
| | $d_{16} = 1.6846$ | $n_8 = 1.84666$ | $v_8 = 23.78$ |
| $r_{17} = \infty$ | | | |
| | $d_{17} = 2.7940$ | | |
| $r_{18} = \infty$ | | | |
| | $d_{18} = 2.1000$ | $n_9 = 1.51633$ | $v_9 = 64.14$ |

-continued

Embodiment 6
f = 1.50~2.61, F/7.1~17.7, 2ω = 113.1°~37.2°
object distance = 13.4~2.35, image height = 1.205

| | | | |
|---|---|---|---|
| $r_{19} = \infty$ | | | |
| | $d_{19} = 0.9800$ | $n_{10} = 1.51633$ | $v_{10} = 64.14$ |
| $r_{20} = \infty$ | | | |

| | | |
|---|---|---|
| f | 1.50 | 2.61 |
| $D_0$ | 13.4000 | 2.3500 |
| $D_1$ | 0.20000 | 2.48900 |
| $D_2$ | 2.48900 | 0.20000 | gradient index lens element

| | $N_0$ | $N_1$ | $N_2$ |
|---|---|---|---|
| d line | 1.65000 | $-4.0000 \times 10^{-2}$ | $-1.0542 \times 10^{-3}$ |
| C line | 1.64567 | $-3.9960 \times 10^{-2}$ | $-1.0531 \times 10^{-3}$ |
| F line | 1.66011 | $-4.0093 \times 10^{-2}$ | $-1.0566 \times 10^{-3}$ |

$|1/\{f_2(D_W - D_T)\}| = 0.19$
$|(f_W \cdot f_T)^{1/2}/F_1| = 1.21, H_U/H_S = 0.62,$
$d_{OT}/f_T = 0.90, \beta_{2W} = 0.81$ Embodiment 7
f = 1.46~2.76, F/7.1~16.5, 2ω = 112.9°~41.1°
object distance = 13.4~2.35, image height = 1.205

| | | | |
|---|---|---|---|
| $r_1 = \infty$ | | | |
| | $d_1 = 0.3500$ | $n_1 = 1.88300$ | $v_1 = 40.78$ |
| $r_2 = 0.7822$ | | | |
| | $d_2 = 0.5642$ | | |
| $r_3 = \infty$ | | | |
| | $d_3 = 0.6200$ | $n_2 = 1.51400$ | $v_2 = 75.00$ |
| $r_4 = \infty$ | | | |
| | $d_4 = 0.0300$ | | |
| $r_5 = \infty$ | | | |
| | $d_5 = 0.4000$ | $n_3 = 1.52287$ | $v_3 = 59.89$ |
| $r_6 = \infty$ | | | |
| | $d_6 = 0.0500$ | | |
| $r_7 = \infty$ | | | |
| | $d_7 = 0.6449$ | $n_4 = 1.51742$ | $v_4 = 52.43$ |
| $r_8 = -1.6249$ | | | |
| | $d_8 = 0.0500$ | | |
| $r_9 = 5.2248$ | | | |
| | $d_9 = 0.5000$ | $n_5 = 1.51633$ | $v_5 = 64.14$ |
| $r_{10} = -2.6718$ | | | |
| | $d_{10} = 0.0500$ | | |
| $r_{11} = \infty$ (stop) | | | |
| | $d_{11}$ $D_1$ (variable) | | |
| $r_{12} = -3.2106$ | | | |
| | $d_{12} = 0.3000$ | $n_6 = 1.88300$ | $v_6 = 40.76$ |
| $r_{13} = 3.7268$ | | | |
| | $d_{13}$ $D_2$ (variable) | | |
| $r_{14} = 5.1723$ | | | |
| | $d_{14} = 5.2987$ | $n_7$ (gradient index lens element) | |
| $r_{15} = \infty$ | | | |
| | $d_{15} = 2.9044$ | | |
| $r_{16} = \infty$ | | | |
| | $d_{16} = 2.1000$ | $n_8 = 1.51633$ | $v_8 = 64.14$ |
| $r_{17} = \infty$ | | | |
| | $d_{17} = 0.9800$ | $n_9 = 1.51633$ | $v_9 = 64.14$ |
| $r_{18} = \infty$ | | | |

| | | |
|---|---|---|
| f | 1.46 | 2.76 |
| $D_0$ | 13.4000 | 2.3500 |
| $D_1$ | 0.30000 | 2.03085 |
| $D_2$ | 2.03085 | 0.30000 |

-continued

Embodiment 7
f = 1.46~2.76, F/7.1~16.5, 2ω = 112.9°~41.1°
object distance = 13.4~2.35, image height = 1.205 gradient index lens element

|        | $N_0$   | $N_1$                  | $n_2$                   |
|--------|---------|------------------------|-------------------------|
| d line | 1.70000 | $-2.0000 \times 10^{-2}$ | $3.6899 \times 10^{-4}$ |
| C line | 1.69475 | $-2.0060 \times 10^{-2}$ | $3.6899 \times 10^{-4}$ |
| F line | 1.71225 | $-1.9860 \times 10^{-2}$ | $3.6899 \times 10^{-4}$ |

$|1/\{f_2(D_W - D_T)\}| = 0.30$
$|(f_W \cdot f_T)^{1/2}/f_1| = 1.36$, $H_U/H_S = 0.36$,
$d_{OT}/f_T = 0.85$, $\beta_{2W} = 0.89$

Embodiment 8
f = 1.83~2.13, F/8.9~12.3, 2ω = 131°~75.3°
object distance = 14.4~2.0, image height = 1.61

| $r_1 = \infty$ | | | |
| | $d_1 = 0.3800$ | $n_1 = 1.88300$ | $v_1 = 40.78$ |
| $r_2 = 1.0600$ | | | |
| | $d_2 = 0.7200$ | | |
| $r_3 = \infty$ | | | |
| | $d_3 = 0.4000$ | $n_2 = 1.52287$ | $v_2 = 59.89$ |
| $r_4 = \infty$ | | | |
| | $d_4 = 0.0300$ | | |
| $r_5 = \infty$ | | | |
| | $d_5 = 0.6200$ | $n_3 = 1.51400$ | $v_3 = 75.00$ |
| $r_6 = \infty$ | | | |
| | $d_6 = 0.0500$ | | |
| $r_7 = 3.1860$ | | | |
| | $d_7 = 1.5100$ | $n_4 = 1.72916$ | $v_4 = 54.68$ |
| $r_8 = -2.3660$ | | | |
| | $d_8 = 0.0500$ | | |
| $r_9 = \infty$ (stop) | | | |
| | $d_9 = D_1$ (variable) | | |
| $r_{10} = \infty$ | | | |
| | $d_{10} = 0.2800$ | $n_5 = 1.59551$ | $v_5 = 39.24$ |
| $r_{11} = 2.9200$ | | | |
| | $d_{11} = 0.1800$ | | |
| $r_{12} = \infty$ | | | |
| | $d_{12} = D_2$ (variable) | | |
| $r_{13} = \infty$ | | | |
| | $d_{13} = -0.0800$ | | |
| $r_{14} = 4.2960$ | | | |
| | $d_{14} = 1.8000$ | $n_6 = 1.72916$ | $v_6 = 54.68$ |
| $r_{15} = -2.0350$ | | | |
| | $d_{15} = 0.3200$ | $n_7 = 1.84666$ | $v_7 = 23.78$ |
| $r_{16} = -5.8750$ | | | |
| | $d_{16} = 2.0900$ | | |
| $r_{17} = \infty$ | | | |
| | $d_{17} = 1.2000$ | $n_8 = 1.51633$ | $v_8 = 64.14$ |
| $r_{18} = \infty$ | | | |
| | $d_{18} = 0.0100$ | $n_9 = 1.56384$ | $v_9 = 60.67$ |
| $r_{19} = \infty$ | | | |
| | $d_{19} = 1.2000$ | $n_{10} = 1.53172$ | $v_{10} = 48.84$ |
| $r_{20} = \infty$ | | | |
| | $d_{20} = 0.0300$ | $n_{11} = 1.56384$ | $v_{11} = 60.67$ |
| $r_{21} = \infty$ | | | |

| f     | 1.83     | 2.13    |
|-------|----------|---------|
| $D_0$ | 14.40000 | 2.00000 |
| $D_1$ | 0.20000  | 2.09000 |
| $D_2$ | 2.20000  | 0.31000 |

$|1/\{f_2(D_W - D_T)\}| = 0.11$
$|(f_W \cdot f_T)^{1/2}/f_1| = 0.89$, $H_U/H_S = 0.36$,
$d_{OT}/f_T = 0.94$, $\beta_{2W} = 8.30$, $\phi3 - \phi FS = 0.6$ mm

Embodiment 9
f = 1.97~2.52, F/9.2~15.6, 2ω = 129.9°~56.3°
object distance = 15~2.0, image height = 1.61

| $r_1 = \infty$ | | | |
| | $d_1 = 0.4000$ | $n_1 = 1.88300$ | $v_1 = 40.78$ |
| $r_2 = 1.0945$ | | | |
| | $d_2 = 0.8692$ | | |
| $r_3 = \infty$ | | | |
| | $d_3 = 0.4000$ | $n_2 = 1.52287$ | $v_2 = 59.89$ |
| $r_4 = \infty$ | | | |
| | $d_4 = 0.0300$ | | |
| $r_5 = \infty$ | | | |
| | $d_5 = 0.6200$ | $n_3 = 1.51400$ | $v_3 = 75.00$ |
| $r_6 = \infty$ | | | |
| | $d_6 = 0.1000$ | | |
| $r_7 = 2.1389$ | | | |
| | $d_7 = 0.5000$ | $n_4 = 1.88300$ | $v_4 = 40.76$ |
| $r_8 = 1.0592$ | | | |
| | $d_8 = 1.4605$ | $n_5 = 1.63930$ | $v_5 = 44.87$ |
| $r_9 = -2.1142$ | | | |
| | $d_9 = 0.1000$ | | |
| $r_{10} = \infty$ (stop) | | | |
| | $d_{10} = D_1$ (variable) | | |
| $r_{11} = -59.6121$ | | | |
| | $d_{11} = 0.3000$ | $n_6 = 1.88300$ | $v_6 = 40.76$ |
| $r_{12} = 3.8932$ | | | |
| | $d_{12} = D_2$ (variable) | | |
| $r_{13} = 4.3415$ | | | |
| | $d_{13} = 1.5693$ | $n_7 = 1.77250$ | $v_7 = 49.60$ |
| $r_{14} = -2.1637$ | | | |
| | $d_{14} = 0.2810$ | $n_8 = 1.90135$ | $v_8 = 31.55$ |
| $r_{15} = -7.3937$ | | | |
| | $d_{15} = 3.4307$ | | |
| $r_{16} = \infty$ | | | |
| | $d_{16} = 1.5000$ | $n_9 = 1.51633$ | $v_9 = 64.14$ |
| $r_{17} = \infty$ | | | |
| | $d_{17} = 1.2500$ | $n_{10} = 1.51633$ | $v_{10} = 64.14$ |
| $r_{18} = \infty$ | | | |

| f     | 1.97     | 2.52    |
|-------|----------|---------|
| $D_0$ | 15.00000 | 2.00000 |
| $D_1$ | 0.20000  | 2.69967 |
| $D_2$ | 2.74757  | 0.25000 |

$|1/\{f_2(D_W - D_T)\}| = 0.10$
$|(f_W \cdot f_T)^{1/2}/f_1| = 0.95$, $H_U/H_S = 0.11$,
$d_{OT}/f_T = 0.79$, $\beta_{2W} = 2.1$

Embodiment 10
f = 1.14~1.53, F/7.3~12, 2ω = 132.9°~65.3°
object distance = 12~2.2, image height = 1.05

| $r_1 = \infty$ | | | |
| | $d_1 = 0.2600$ | $n_1 = 1.88300$ | $v_1 = 40.78$ |
| $r_2 = 0.7216$ | | | |
| | $d_2 = 0.4587$ | | |
| $r_3 = \infty$ | | | |
| | $d_3 = 0.4000$ | $n_2 = 1.52287$ | $v_2 = 59.89$ |
| $r_4 = \infty$ | | | |
| | $d_4 = 0.0300$ | | |
| $r_5 = \infty$ | | | |
| | $d_5 = 0.6200$ | $n_3 = 1.51400$ | $v_3 = 75.00$ |
| $r_6 = \infty$ | | | |
| | $d_6 = 0.0400$ | | |
| $r_7 = 3.6037$ | | | |
| | $d_7 = 0.6175$ | $n_4 = 1.88300$ | $v_4 = 40.76$ |
| $r_8 = -1.8142$ | | | |
| | $d_8 = 0.0500$ | | |
| $r_9 = \infty$ (stop) | | | |
| | $d_9 = D_1$ (variable) | | |

-continued

Embodiment 10
f = 1.14~1.53, F/7.3~12, 2ω = 132.9°~65.3°
object distance = 12~2.2, image height = 1.05

| | | | |
|---|---|---|---|
| $r_{10} = -8.7484$ | | | |
| | $d_{10} = 0.2000$ | $n_5 = 1.90135$ | $v_5 = 3.1.55$ |
| $r_{11} = 2.5850$ | | | |
| | $d_{11} = D_2$ (variable) | | |
| $r_{12} = \infty$ | | | |
| | $d_{12} = 0$ | | |
| $r_{13} = 3.6204$ | | | |
| | $d_{13} = 0.6208$ | $n_6 = 1.88300$ | $v_6 = 40.76$ |
| $r_{14} = -3.7375$ | | | |
| | $d_{14} = 0.0500$ | | |
| $r_{15} = 4.4029$ | | | |
| | $d_{15} = 0.8061$ | $n_7 = 1.51633$ | $v_7 = 64.14$ |
| $r_{16} = -1.6972$ | | | |
| | $d_{16} = 0.2000$ | $n_8 = 1.84666$ | $v_8 = 23.78$ |
| $r_{17} = 39.0105$ | | | |
| | $d_{17} = 1.2038$ | | |
| $r_{18} = \infty$ | | | |
| | $d_{18} = 1.1000$ | $n_9 = 1.51633$ | $v_9 = 64.14$ |
| $r_{19} = \infty$ | | | |
| | $d_{19} = 0.8000$ | $n_{10} = 1.51633$ | $v_{10} = 64.14$ |
| $r_{20} = \infty$ | | | |

| | | |
|---|---|---|
| f | 1.14 | 1.53 |
| $D_0$ | 12.00000 | 2.20000 |
| $D_1$ | 0.15000 | 1.32311 |
| $D_2$ | 1.32311 | 0.15000 |

$|1/\{f_2(D_W - D_T)\}| = 0.39$
$|(f_W \cdot f_T)^{1/2}/f_1| = 0.90$, $H_U/H_S = 0.44$,
$d_{OT}/f_T = 1.44$, $\beta_{2W} = 1.36$, $\phi3 - \phi FS = 0.44$ mm Embodiment 11
f = 1.35~2.04, F6.4~11.7, 2ω = 130°~56.6°
object distance = 12~2.1, image height = 1.21

| | | | |
|---|---|---|---|
| $r_1 = \infty$ | | | |
| | $d_1 = 0.3000$ | $n_1 = 1.88300$ | $v_1 = 40.78$ |
| $r_2 = 0.7564$ | | | |
| | $d_2 = 0.5000$ | | |
| $r_3 = \infty$ | | | |
| | $d_3 = 0.4000$ | $n_2 = 1.52287$ | $v_2 = 59.89$ |
| $r_4 = \infty$ | | | |
| | $d_4 = 0.0300$ | | |
| $r_5 = \infty$ | | | |
| | $d_5 = 0.6200$ | $n_3 = 1.51400$ | $v_3 = 75.00$ |
| $r_6 = \infty$ | | | |
| | $d_6 = 0.0500$ | | |
| $r_7 = 16.9172$ | | | |
| | $d_7 = 0.6000$ | $n_4 = 1.51633$ | $v_4 = 64.14$ |
| $r_8 = -1.5139$ | | | |
| | $d_8 = 0.0500$ | | |
| $r_9 = 5.5489$ | | | |
| | $d_9 = 0.5000$ | $n_5 = 1.51633$ | $v_5 = 64.14$ |
| $r_{10} = -2.7205$ | | | |
| | $d_{10} = 0.5000$ | | |
| $r_{11} = \infty$ (stop) | | | |
| | $d_{11} = D_1$ (variable) | | |
| $r_{12} = -6.2390$ | | | |
| | $d_{12} = 0.2500$ | $n_6 = 1.88300$ | $v_6 = 40.76$ |
| $r_{13} = 2.6147$ | | | |
| | $d_{13} = D_2$ (variable) | | |
| $r_{14} = 6.1306$ | | | |
| | $d_{14} = 1.1000$ | $n_7 = 1.72916$ | $v_7 = 54.68$ |
| $r_{15} = -1.5473$ | | | |
| | $d_{15} = 0.2500$ | $n_8 = 1.84666$ | $v_8 = 23.78$ |
| $r_{16} = -3.6654$ | | | |
| | $d_{16} = 0.0500$ | | |

-continued

Embodiment 11
f = 1.35~2.04, F6.4~11.7, 2ω = 130°~56.6°
object distance = 12~2.1, image height = 1.21

| | | | |
|---|---|---|---|
| $r_{17} = 6.0286$ | | | |
| | $d_{17} = 0.6288$ | $n_9 = 1.51633$ | $v_9 = 64.14$ |
| $r_{18} = \infty$ | | | |
| | $d_{18} = 2.9631$ | | |
| $r_{19} = \infty$ | | | |
| | $d_{19} = 1.5000$ | $n_{10} = 1.51633$ | $v_{10} = 64.14$ |
| | $d_{20} = 1.0000$ | $n_{11} = 1.51633$ | $v_{11} = 64.14$ |
| $r_{21} = \infty$ | | | |

| | | |
|---|---|---|
| f | 1.35 | 2.04 |
| $D_0$ | 12.00000 | 2.10000 |
| $D_1$ | 0.20000 | 1.54000 |
| $D_2$ | 1.59000 | 0.25000 |

$|1/\{f_2(D_W - D_T)\}|$ 0.36
$|(f_W \cdot f_T)^{1/2}/f_1| = 1.17$, $H_U/H_S$ 0.52,
$d_{OT}/f_T = 1.03$, $\beta_{2W} = 1.14$ Embodiment 12
f = 1.21~1.48, F/6.8~9.7, 2ω = 149.6°~86.3°
object distance = 12~1.9, image height = 1.1

| | | | |
|---|---|---|---|
| $r_1 = \infty$ | | | |
| | $d_1 = 0.2500$ | $n_1 = 1.88300$ | $v_1 = 40.78$ |
| $r_2 = 0.7403$ | | | |
| | $d_2 = 0.4194$ | | |
| $r_3 = \infty$ | | | |
| | $d_3 = 0.2000$ | $n_2 = 1.52287$ | $v_2 = 59.89$ |
| $r_4 = \infty$ | | | |
| | $d_4 = 0.0500$ | | |
| $r_5 = 2.1275$ | | | |
| | $d_5 = 1.7387$ | $n_3 = 1.68893$ | $v_3 = 31.07$ |
| $r_6 = -1.3323$ | | | |
| | $d_6 = 0.0500$ | | |
| $r_7 = \infty$ (stop) | | | |
| | $d_7 = D_1$ (variable) | | |
| $r_8 = 282.6298$ | | | |
| | $d_8 = 0.2000$ | $n_4 = 1.84666$ | $v_4 = 23.78$ |
| $r_9 = 2.6319$ | | | |
| | $d_9 = D_2$ (variable) | | |
| $r_{10} = 4.5636$ | | | |
| | $d_{10} = 0.8674$ | $n_5 = 1.88300$ | $v_5 = 40.76$ |
| $r_{11} = -1.7560$ | | | |
| | $d_{11} = 0.2000$ | $n_6 = 1.84666$ | $v_6 = 23.78$ |
| $r_{12} = -4.2149$ | | | |
| | $d_{12} = 0.1000$ | | |
| $r_{13} = \infty$ | | | |
| | $d_{13} = 0.6200$ | $n_7 = 1.51400$ | $v_7 = 75.00$ |
| $r_{14} = \infty$ | | | |
| | $d_{14} = 1.2120$ | | |
| $r_{15} = \infty$ | | | |
| | $d_{15} = 1.0000$ | $n_8 = 1.51633$ | $v_8 = 64.14$ |
| $r_{16} = \infty$ | | | |
| | $d_{16} = 0.5000$ | $n_9 = 1.51633$ | $v_9 = 64.14$ |
| $r_{17} = \infty$ | | | |

| | | |
|---|---|---|
| f | 1.21 | 1.48 |
| $D_0$ | 12.00000 | 1.90000 |
| $D_1$ | 0.10000 | 1.35581 |
| $D_2$ | 1.40581 | 0.15000 |

$|1/\{f_2(D_W - D_T)\}| = 0.25$
$|(f_W \cdot f_T)^{1/2}/f_1| = 0.79$, $H_U/H_S = 0.45$,
$d_{OT}/f_T = 1.28$, $\beta_{2W} = 3.63$ wherein the reference symbols $r_1, r_2 \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $v_1, v_2 \ldots$ represent Abbe's numbers of the respective lens elements. A reference symbol $D_0$ designates an object distance. Lengths are specified in millimeter in the numerical data.

Figure 4A:
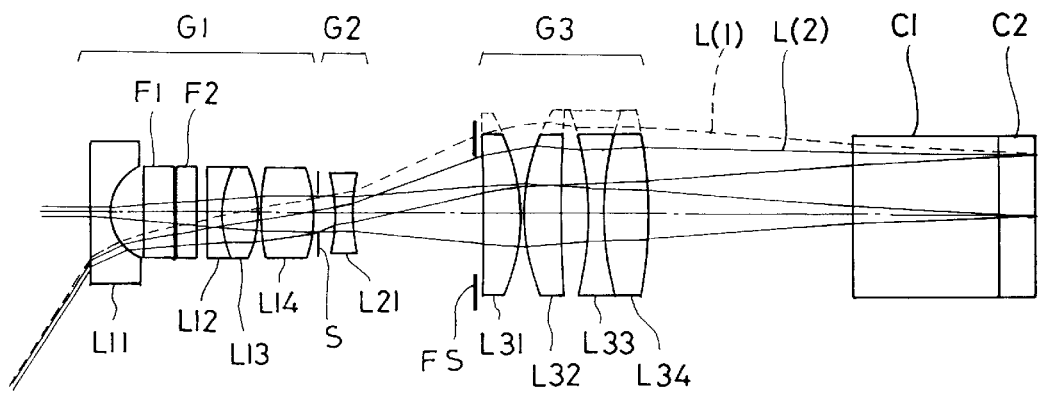
FIGS. 4A and 4B show sectional views illustrating a composition of a first embodiment of the objective optical system according to the present invention.
Figure 4B:
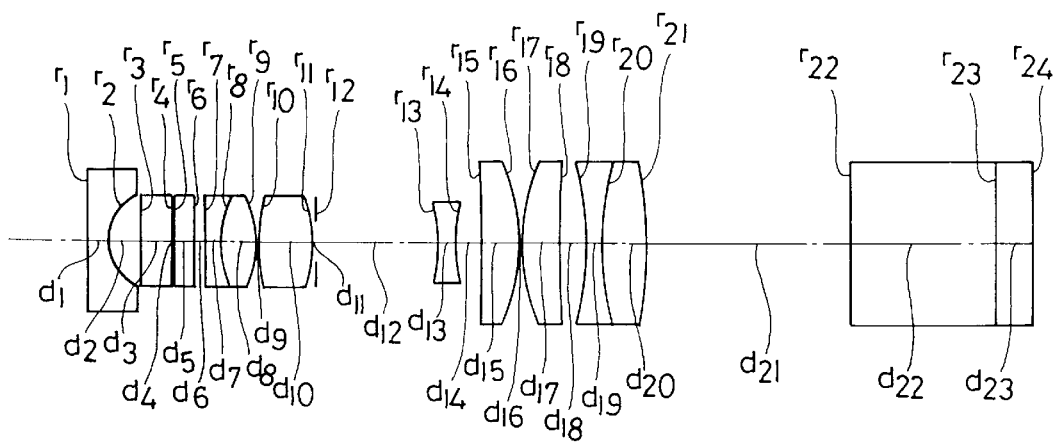

The first embodiment has a composition illustrated in FIGS. 4A and 4B which correspond to a wide position and a tele position respectively. The first embodiment comprises, in order from the object side, a first lens unit G1 having a positive refractive power, a second lens unit G2 having a negative refractive power and a third lens unit G3 having a positive refractive power as shown in FIGS. 4A and 4B.

The first lens unit comprises, in order from the object side, a negative lens component L11, a cemented lens component consisting of a negative lens element L12 and a positive lens element L13, and a positive lens component L14, and has a function to lead axial and offaxial rays to the second lens unit. Plane parallel plates F1 and F2 are filters for cutting off rays having specific wavelengths, for example, a YAG laser of 1060 nm and a semiconductor laser of 810 nm or infrared rays. Furthermore, a radius of curvature is equalized between both surfaces of the positive lens element L13 of the cemented lens component to obtain an advantage for working. The second lens unit G2 comprises a single negative lens component L21 and is moved along an optical axis to impart a vari-focal function to the optical system. A radius of curvature is equalized between both surfaces of the negative lens component L21 to obtain advantages for reduction of a manufacturing cost and prevention of erroneous assembly. Furthermore, the third lens unit G3 comprises, in order from the object side, a positive lens component L31, a positive lens component L32 and a cemented lens component consisting of a negative lens element L33 and a positive lens element L34, and has a function to image a diverging light bundle coming from the second lens unit. The two positive lens components L31 and L32 disposed on the object side have the same shape and the same refractive index. The negative lens element L33 has a radius of curvature which is equalized between both surfaces to obtain advantages for working and assembly. The optical system preferred as the first embodiment comprises an aperture stop which is disposed between the first lens unit G1 and the second lens unit G2. The first embodiment satisfies the conditions (1) and (2), thereby having a short total length while favorably correcting aberrations.

Moreover, the optical system preferred as the first embodiment satisfies the condition (3) so as to have a small outside diameter. In FIG. 4A, a reference symbol L(1) represents an offaxial upper ray which has passed through an outermost diametrical portion of the aperture stop and a reference symbol L(2) designates an offaxial upper ray when an outside diameter of the third lens unit is reduced. As is apparent from this drawing, the outside diameter of the third lens unit is enlarged as indicated by a dashed line when a ray is allowed to pass through the outermost diametrical portion of the aperture stop. The outside diameter of the third lens unit can be reduced when an outside diameter of the aperture stop is reduced within a range wherein the condition (3) is satisfied. In addition, offaxial rays are intercepted by a field stop FS disposed in the third lens unit G3 to reduce the outside diameter of the third lens unit.

Figure 5A:
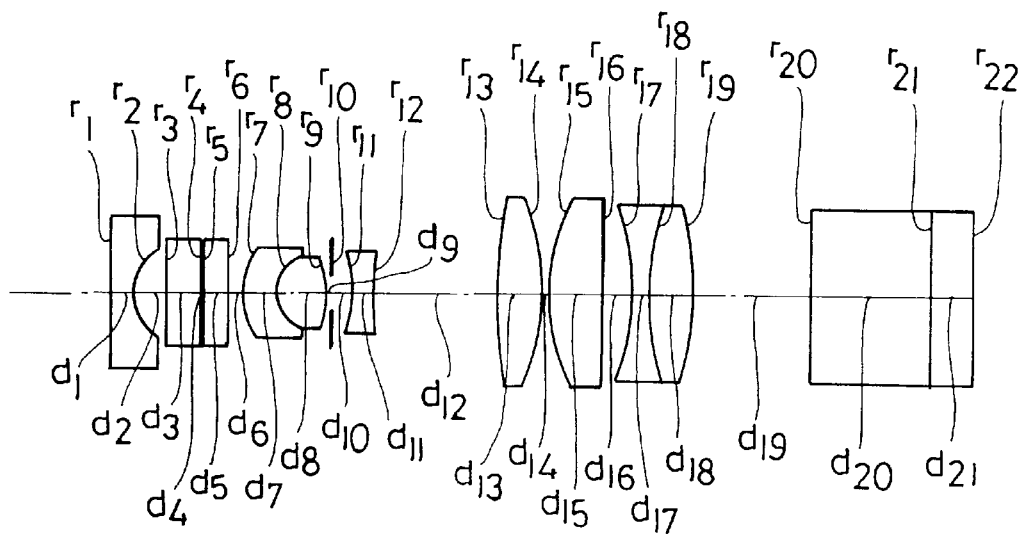
FIGS. 5A and 5B show sectional views illustrating a composition of a second embodiment of the objective optical system according to the present invention.
Figure 5B:
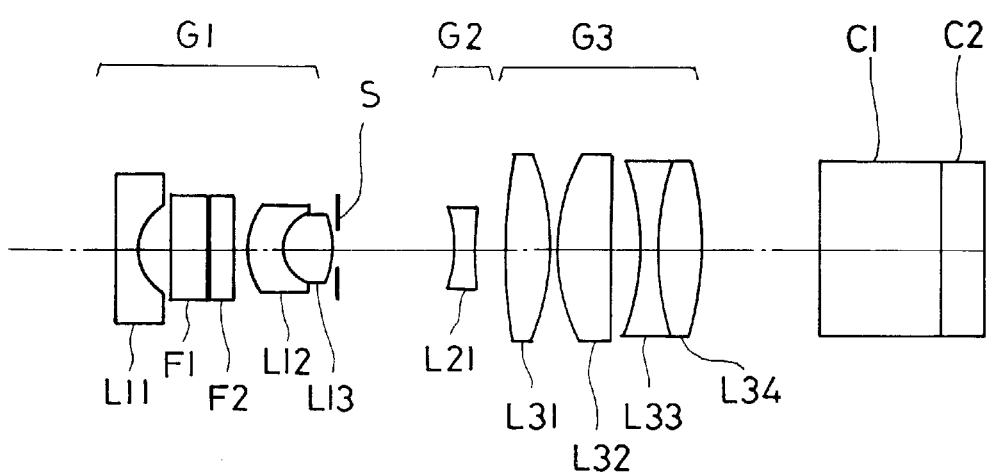

The second embodiment has a composition illustrated in FIGS. 5A (a wide position) and 5B (a tele position), or comprises, in order from the object side, a first lens unit G1 having a positive refractive power, a second lens unit G2 having a negative refractive power and a third lens unit G3 having a positive refractive power which have the same functions as those of the lens units of the first embodiment.

The first lens unit comprises, in order from the object side, a negative lens component and a cemented lens component consisting of a negative lens element and a positive lens element, the second lens unit comprises a single negative lens component, and the third lens unit comprises, in order from the object side, a positive lens component, a positive lens component and a cemented lens component consisting of a negative lens element and a positive lens element. An aperture stop S is disposed between the first lens unit and the second lens unit. A number of the lens components disposed in the first lens unit of the second embodiment is smaller by one than that of the lens components used in the first lens unit of the first embodiment.

The second embodiment has a total length of 18.3 mm since it satisfies the conditions (1) and (2), whereby it can have a short total length while favorably correcting aberrations. Furthermore, the second embodiment has an outside diameter of 3.2 mm since it satisfies the condition (3). Moreover, the third embodiment has a sufficiently high observing magnification at the tele position since it satisfies the condition (4).

Figure 6A:
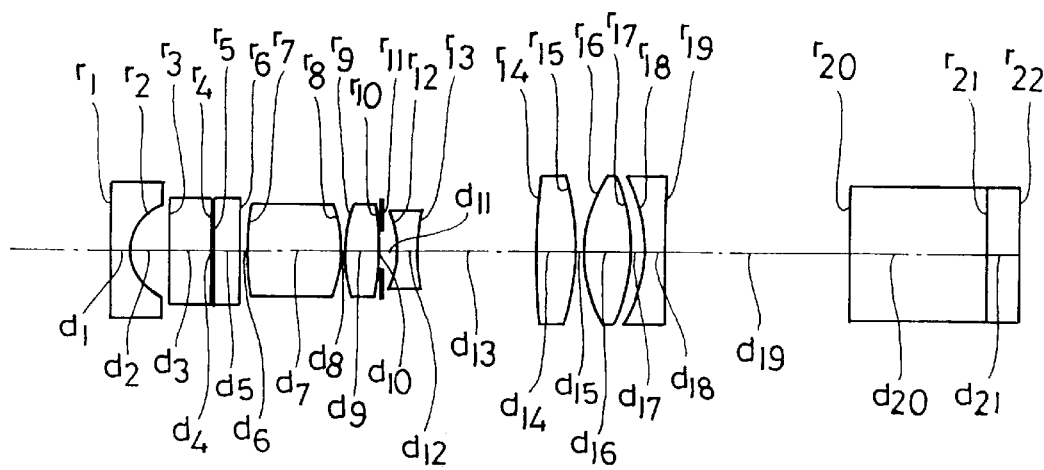
FIGS. 6A and 6B show sectional views illustrating a composition of a third embodiment of the objective optical system according to the present invention.
Figure 6B:
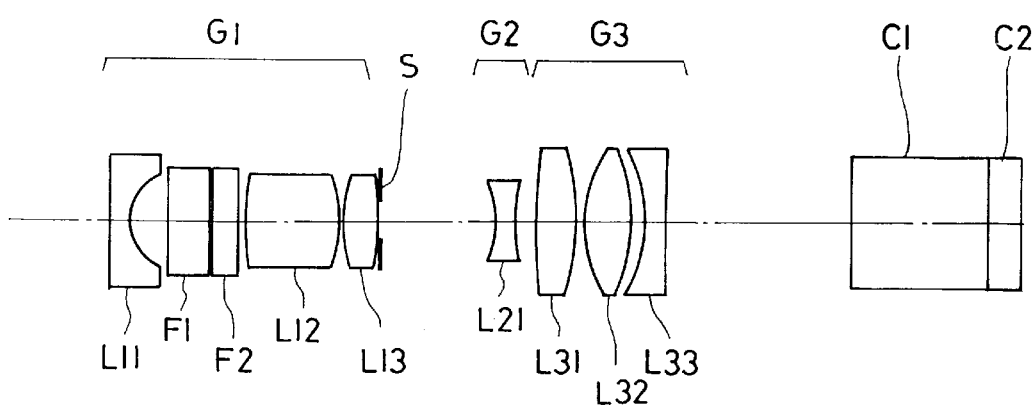

The third embodiment comprises, in order from the object side, a first lens unit G1 having a positive refractive power, a second lens unit G2 having a negative refractive power and a third lens unit G3 having a positive refractive power as shown in FIG. 6A (a wide position) and FIG. 6B (a tele position): functions of the lens units being substantially the same as those of the lens units of the first embodiment.

The first lens unit G1 comprises, in order from the object side, a negative lens component L11, a positive lens component L12 and a positive lens component L13, the second lens unit G2 comprises a single lens component L21, and the third lens unit comprises, in order from the object side, a positive lens component L31, a positive lens component L32 and a negative lens component L33. Furthermore, an aperture stop is disposed between the first lens unit G1 and the second lens unit G2.

The third embodiment has a total length of 13.2 mm since it satisfies the conditions (1) and (2), thereby having a short total length while favorably correcting aberrations. Furthermore, the third embodiment has an outside diameter of 2.2 mm since it satisfies the condition (3). Moreover, the third embodiment has a sufficiently high observing magnification at the tele position since it satisfies the condition (4).

Figure 7A:
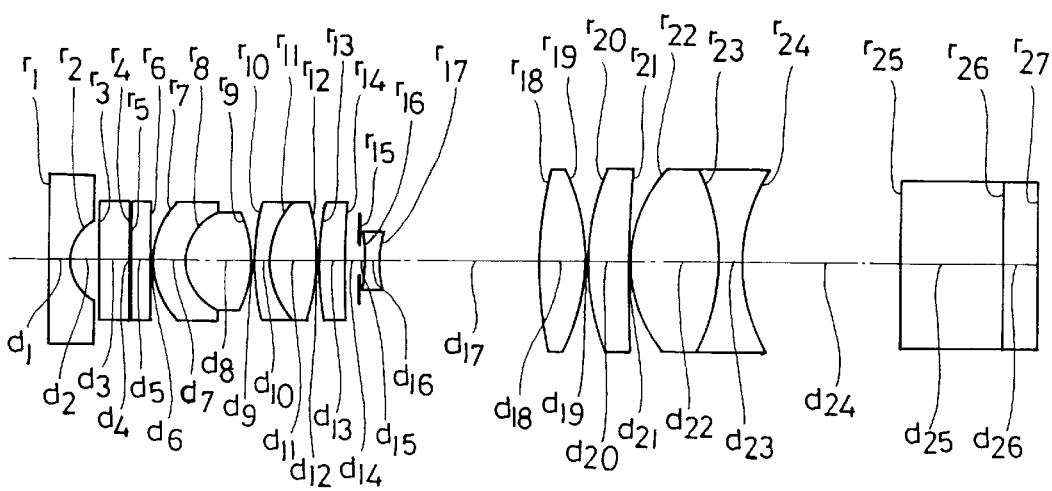
FIGS. 7A and 7B show sectional views illustrating a composition of a fourth embodiment of the objective optical system according to the present invention.
Figure 7B:
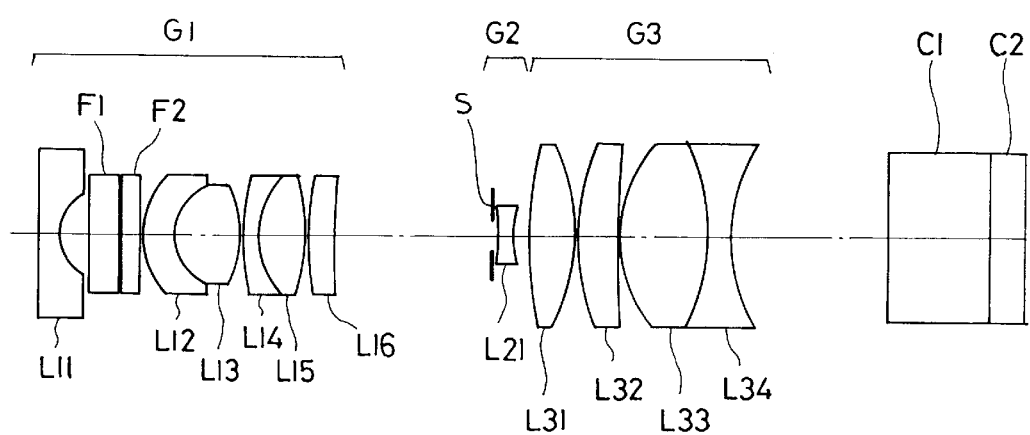

The fourth embodiment comprises, in order from the object side, a first lens unit G1 having a positive refractive power, a second lens unit G2 having a negative refractive power and a third lens unit G3 having a positive refractive power as shown in FIG. 7A (a wide position) and FIG. 7B (a tele position): functions of the lens units being substantially the same as those of the lens units of the first embodiment. Furthermore, an aperture stop S is disposed between the first lens unit and the second lens unit.

In the fourth embodiment, the first lens unit G1 comprises, in order from the object side, a negative lens component L11, a cemented lens component consisting of a negative lens element L12 and a positive lens element L13, a cemented lens component consisting of a negative lens element L14 and a positive lens element L15, and a positive lens component L16, the second lens unit comprises a single negative lens component, and the third lens unit comprises, in order from the object side, a positive lens component L31, a positive lens component L32 and a cemented lens component consisting of a positive lens element L33 and a negative lens element L34.

The optical system preferred as the fourth embodiment is configured to have a short total length and a small outside diameter while favorably correcting aberrations by satisfying the conditions (1), (2) and (3). In each of the two cemented lens components used in the first lens unit, the negative lens element has a refractive index higher than that of the positive lens element so as to favorably correct a Petzval's sum which is overcorrected in the optical system as a whole.

Generally speaking, a stop diameter is fixed for an objective optical system for endoscopes since a restriction is posed on an outside diameter of the optical system. When the optical system according to the present invention has a high vari-focal ratio with a diameter kept fixed for the aperture stop disposed between the first lens unit G1 and the second lens unit G2, however, the optical system has an extremely large F number at the tele position, whereby an image may be blurred under an influence due to diffraction.

For this reason, it is desirable to move the second lens unit G2 integrally with the aperture stop S when the influence due to diffraction is problematic in the optical system according to the present invention. By configuring the optical system as described above, it is possible to enlarge a diameter of a light bundle at the tele position, thereby preventing an image from being blurred.

Figure 8A:
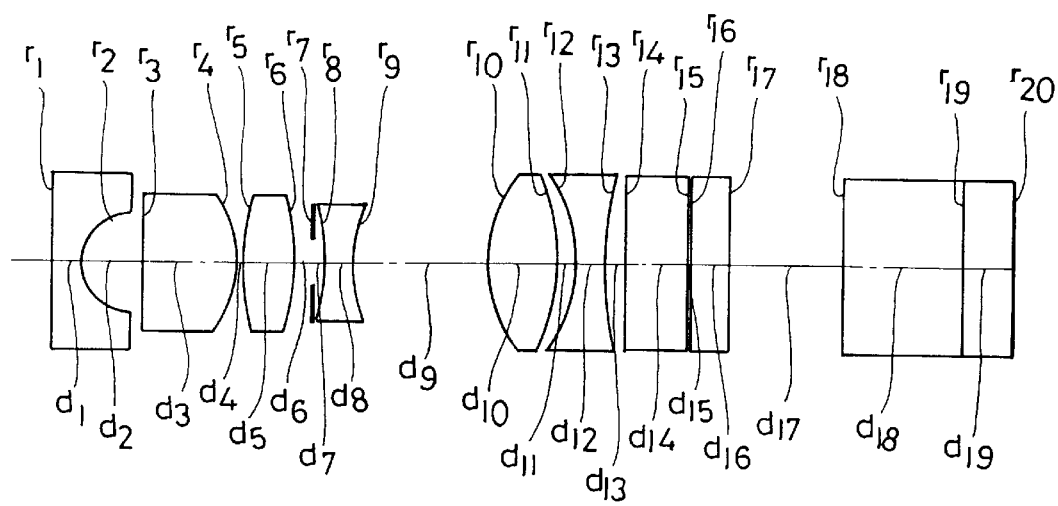
FIGS. 8A and 8B show sectional views illustrating a composition of a fifth embodiment of the objective optical system according to the present invention.
Figure 8B:
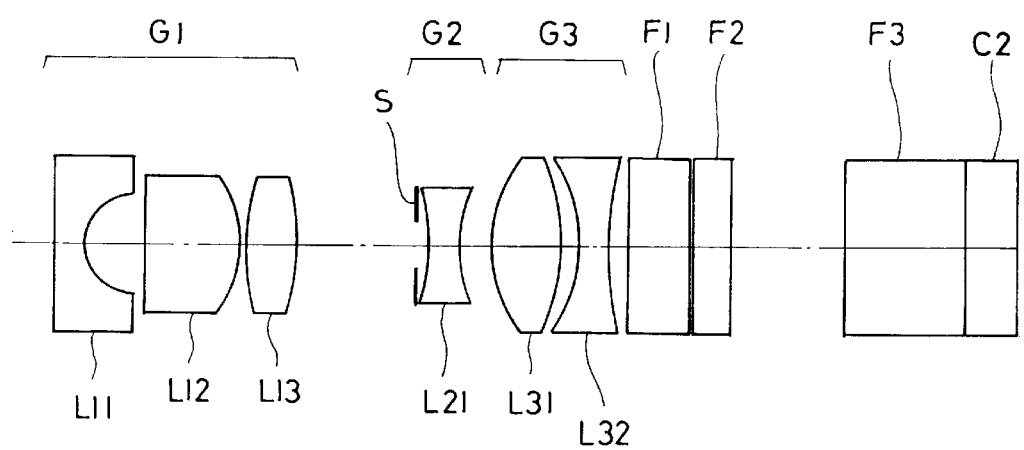

The fifth embodiment has a composition illustrated in FIG. 8A (a wide position) and FIG. 8B (a tele position), or comprises a first lens unit G1 having a positive refractive power, a second lens unit G2 having a negative refractive power and a third lens unit G3 having a positive refractive power: functions of the lens it units being substantially the same as those of the lens units of the first embodiment.

The first lens unit G1 comprises, in order from the object side, a negative lens component L11, a positive lens component L12 and a positive lens component L13, the second lens unit G2 comprises a single negative lens component L21, the third lens unit G3 comprises, in order from the object side, a positive lens component L31 and a negative lens component L32, and an aperture stop S is disposed between the first lens unit G1 and the second lens unit G2. Further, the third lens unit G3 comprises an aspherical surface which favorably corrects spherical aberration produced in this lens unit in particular. In order to correct the spherical aberration, it is desirable that the spherical surface has such a shape as to weaken a positive refractive power from an optical axis toward a marginal portion.

A shape of the aspherical surface used in the fifth embodiment is approximated by the following formula (a):

$$x = (y^2/r)/[1+\{1-P(y/r)^2\}^{1/2}] + \Sigma A_{2i} y^2 \quad (a)$$

wherein a direction along the optical axis is taken as the x axis, a direction perpendicular to the optical axis is taken as the y axis, the reference symbol r represents a radius of curvature on the optical axis, the reference symbol P designates a conical constant and the reference symbol $A_{2i}$ denote an aspherical surface coefficient. Values of P, $A_{2i}$, etc. in the fifth embodiment are specified in the numerical data.

In the fifth embodiment, filter F3 which cuts off rays having specific wavelengths is disposed on the image side of the third lens unit.

Figure 9A:
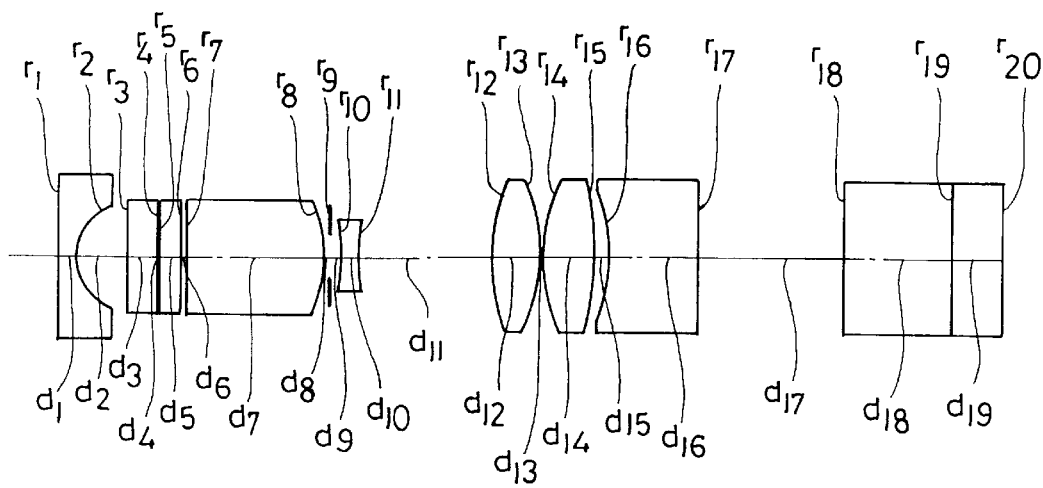
FIGS. 9A and 9B show sectional views illustrating a composition of a sixth embodiment of the objective optical system according to the present invention.
Figure 9B:
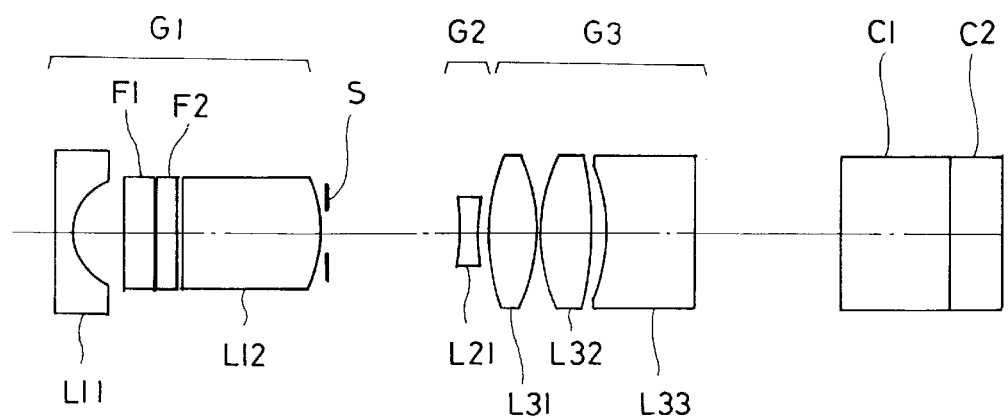

The sixth embodiment comprises a first lens unit G1 having a positive refractive power, a second lens unit G2 having a negative refractive power and a third lens unit G3 having a positive refractive power as shown in FIG. 9A (a wide position) and FIG. 9B (a tele position): functions of the lens units being substantially the same as those of the lens units of the first embodiment. The first lens unit comprises, in order from the object side, a negative lens component L11 and a positive lens component L12, the second lens unit comprises a single negative lens component L21, and the third lens unit comprises, in order from the object side, a positive lens component L31, a positive lens component L32 and a negative lens component L33. Furthermore, an aperture stop S is disposed between the first lens unit and the second lens unit. The positive lens component disposed in the first lens unit is configured as the so-called radial type gradient index lens component which has a refractive index distribution in a radial direction from an optical axis. The radial type gradient index lens component used in the sixth embodiment has a distribution in which a refractive index is lowered from the optical axis toward a marginal portion which exhibits an effect to correct spherical aberration produced at the tele position in particular.

The refractive index distribution of the radial type gradient index lens component used in the sixth embodiment is approximated by the following formula (b):

$$N(r) = N_0 + N_1 r^2 + N_2 r^4 + \quad (b)$$

wherein the reference symbol $N_0$ represents a refractive index on the optical axis, the reference symbols $N_1$, $N_2$, . . . designate refractive index distribution coefficients of the first order, second order, . . . and the reference symbol r denotes a distance as measured in the radial direction from the optical axis. Values of $N_1$, $N_2$, . . . are specified in the numerical data.

The sixth embodiment satisfies the conditions (1) and (2), whereby it can have a short total length while favorably correcting aberrations. Furthermore, the sixth embodiment satisfies the condition (3) and can have a small outside diameter.

Figure 10A:
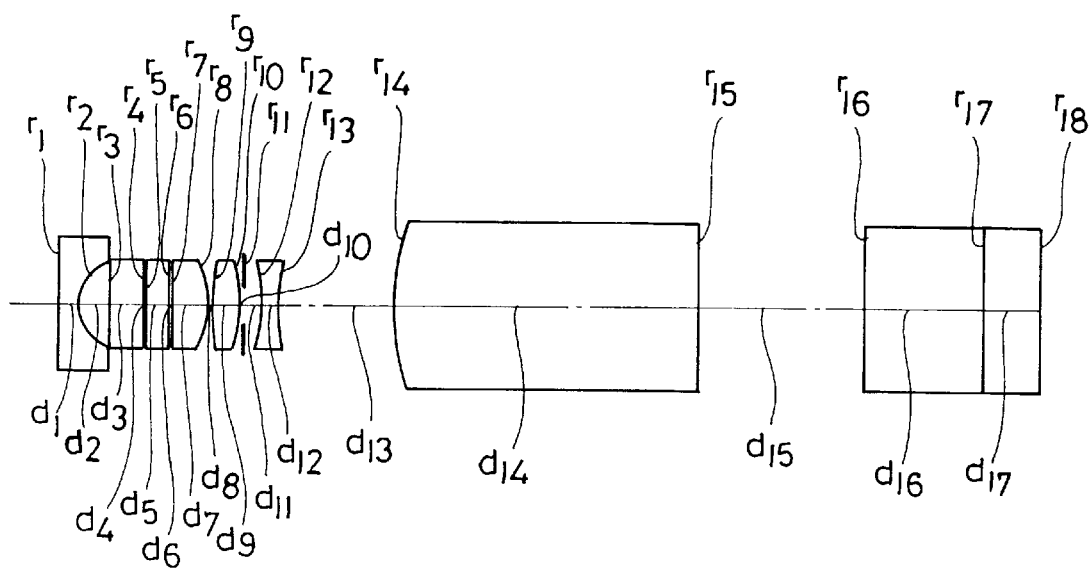
FIGS. 10A and 10B show sectional views illustrating a composition of a seventh embodiment of the objective optical system according to the present invention.
Figure 10B:
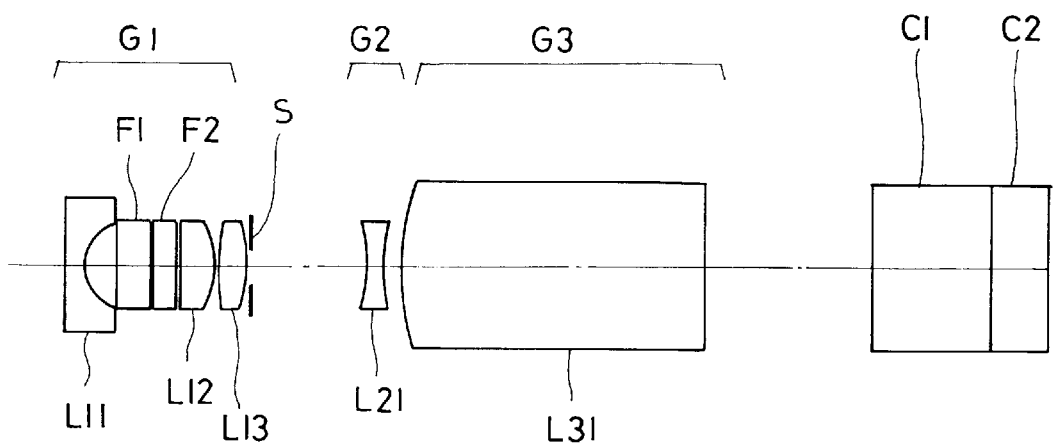

The seventh embodiment comprises, in order from the object side, a first lens unit G1 having a positive refractive power, a second lens unit G2 having a negative refractive power and a third lens unit G3 having a positive refractive power as shown in FIG. 10A (a wide position) and FIG. 10B (a tele position); functions of the lens units being substantially the same as those of the lens units used in the first embodiment.

The first lens unit G1 comprises, in order from the object side, a negative lens component L11, a positive lens component L12 and a positive lens component L13, the second lens unit G2 comprises a single negative lens component L21, the third lens unit G3 comprises a single positive lens component L31, and an aperture stop S is disposed between the first lens unit G1 and the second lens unit G2. In the seventh embodiment, the third lens unit G3 is composed of a single radial type gradient index lens component which is approximated by the formula (b). This gradient index lens component has a distribution wherein a refractive index is lowered from an optical axis toward a marginal portion and exhibits an effect to correct spherical aberration produced at the tele position in particular. Values of the distribution coefficient, etc. of the radial type gradient index lens component are specified in the numerical data.

The seventh embodiment which satisfies the conditions (1) and (2) can have a short total length while favorably correcting aberrations. Furthermore, the seventh embodiment satisfies the condition (3) so that it has a small outside diameter.

An objective optical system which is preferred as the eighth embodiment of the present invention has a composition illustrated in FIG. 11A (a wide position) and FIG. 11B (a tele position), or comprises, in order from the object side, a first lens unit G1 having a positive refractive power, a second lens unit G2 having a negative refractive power and a third lens unit G3 having a positive refractive power. The first lens unit G1 comprises a negative lens component L11 and a positive lens component L12, the second lens unit G2 comprises a negative lens component L21, and the third lens unit G3 comprises, a cemented lens component consisting of a positive lens element L31 and a negative lens element L32 in order from the object side.

Furthermore, an aperture stop S is disposed between the first lens unit G1 and the second lens unit G2. The first lens unit G1 comprises the negative lens component L11, a plane parallel plate F1, a plane parallel plate F2, the positive lens component L12 and the stop S: the plane parallel plate F1 which is disposed between the plane parallel plate F1 and the stop S, and the positive lens component L12 are configured to satisfy the condition (5). The optical system preferred as the eighth embodiment is configured compact since it satisfies the condition (5).

Furthermore, a flare stop FS is disposed on the image side of the second lens unit G2. In FIGS. 11A and 11B, a reference symbol C1 represents a dust proof cover glass plate, a reference symbol C2 designates a cover glass plate for an image pickup device such as a CCD, and reference symbols CE1 and CE2 denote cemented layers. The two plane parallel plates disposed in the first lens unit G1 are filters for cutting off rays within specific wavelength regions: the filter F1 on the object side being an interference type laser cut filter and the filter F2 being an absorption type infrared cut filter.

In order to configure compact the objective optical system which is exemplified by the eighth embodiment, it is desirable that the second lens unit G2 has a magnification $\beta_{2W}$ at the wide position which satisfies the following condition (6):

$$1 < |\beta_{2W}| \tag{6}$$

By disposing the flare stop FS($r_{13}$) on the object side of the third lens unit G3, it is possible to reduce an outside diameter of the third lens unit G3. When a difference is too small between an inside diameter $\phi FS$ of the flare stop FS and an outside diameter $\phi 3$ of a lens element which has a smallest outside diameter in the third lens unit G3, rays outside a visual field fall on a side of the lens element, thereby producing flare.

It is desirable that the optical system according to the present invention such as that exemplified by the eighth embodiment satisfies the following condition (7):

$$0.1 \text{ mm} < \phi 3 - \phi FS < 1.2 \text{ mm} \tag{7}$$

If the lower limit of 0.1 mm of the condition (7) is exceeded, flare may be produced in the third lens unit G3. If the upper limit of 1.2 mm of the condition (7) is exceeded, in contrast, the third lens unit G3 will have a large outside diameter, thereby making it impossible to configure the optical system compact.

In the eighth embodiment, the lens component L32 has a diameter $\phi 3=3.2$ mm and the flare stop has an inside diameter $\phi=2.6$ mm, whereby $\phi 3-\phi FS=0.6$ mm.

It is more desirable to satisfy, in place of the condition (7), the following condition (7-1):

$$0.3 \text{ mm} < \phi 3 - \phi FS < 0.8 \text{ mm} \tag{7-1}$$

Though a flare stop is composed of a thin sheet as in the optical system preferred as the eighth embodiment, it is possible to use as a flare stop a protrusion which is formed in a lens barrel so as to protrude inward.

Furthermore, it is possible to form a stop having a light shielding effect on a lens surface by evaporation or deposition so that the stop functions as flare stop.

Figure 12A:
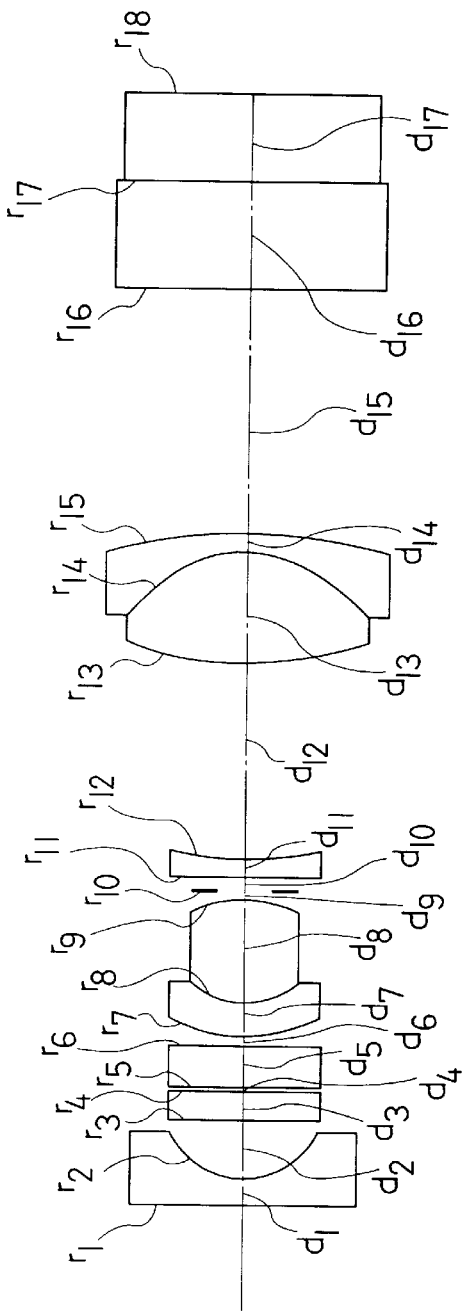
FIGS. 12A and 12B show sectional views illustrating a composition of a ninth embodiment of the objective optical system according to the present invention.
Figure 12B:
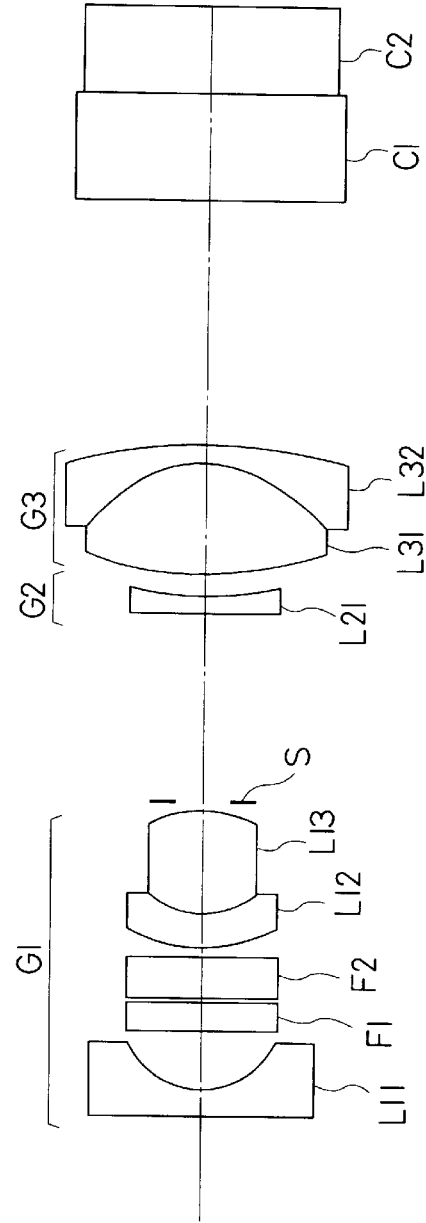

The ninth embodiment of the objective optical system according to the present invention has a composition illustrated in FIG. 12A (a wide position) and FIG. 12B (a tele position), or comprises, in order from the object side, a first lens unit G1 having a positive refractive power, a second lens unit G2 having a negative refractive power and a third lens unit G3 having a positive refractive power.

The first lens unit G1 comprises, in order from the object side, a negative lens component L11 and a cemented lens component consisting of a negative lens element L12 and a positive lens element L13, the second lens unit G2 comprises a single negative lens component L21, and the third lens unit G3 comprises, in order from the object side, a cemented lens component consisting of a positive lens element L31 and a negative lens element L32.

The optical system preferred as the ninth embodiment has favorable optical performance though it has a compact composition consisting of lens components in a number as small as six.

The tenth embodiment of the present invention has a composition illustrated in FIG. 13A and FIG. 13B which correspond to a wide position and a tele position respectively.

The tenth embodiment comprises, in order from the object side, a first lens unit G1 having a positive refractive power, a second lens unit G2 having a negative refractive power and a third lens unit G3 having a positive refractive positive refractive power as shown in FIGS. 13A and 13B. The first lens unit G1 comprises, in order from the object side, a negative lens component L11 and a positive lens component L12, the second lens unit G2 comprises a single negative lens component L21, and the third lens unit G3 comprises, in order from the object side, a positive lens component L31 and a cemented lens component consisting of a positive lens element L32 and a negative lens element L33.

Though the optical system preferred as the tenth embodiment has a compact composition consisting of lens elements in a number as small as six, it has high optical performance since it satisfies the conditions described above.

Furthermore, the optical system preferred as the tenth embodiment comprises an aperture stop which is disposed between the first lens unit G1 and the second lens unit G2, and uses the two positive lens elements in the third lens unit G3, whereby the optical system favorably corrects spherical aberration at the tele position and coma at the wide position.

Furthermore, a flare stop is disposed on the object side of the third lens unit G3. This flare stop has an inside diameter φFS of 1.6 mm, and the positive lens component L31 which is disposed in the third lens unit G3 and adjacent to the flare stop FS has an outside diameter φ3 of 2.0 mm. That is, φ3−φFS=0.4 mm.

Figure 14A:
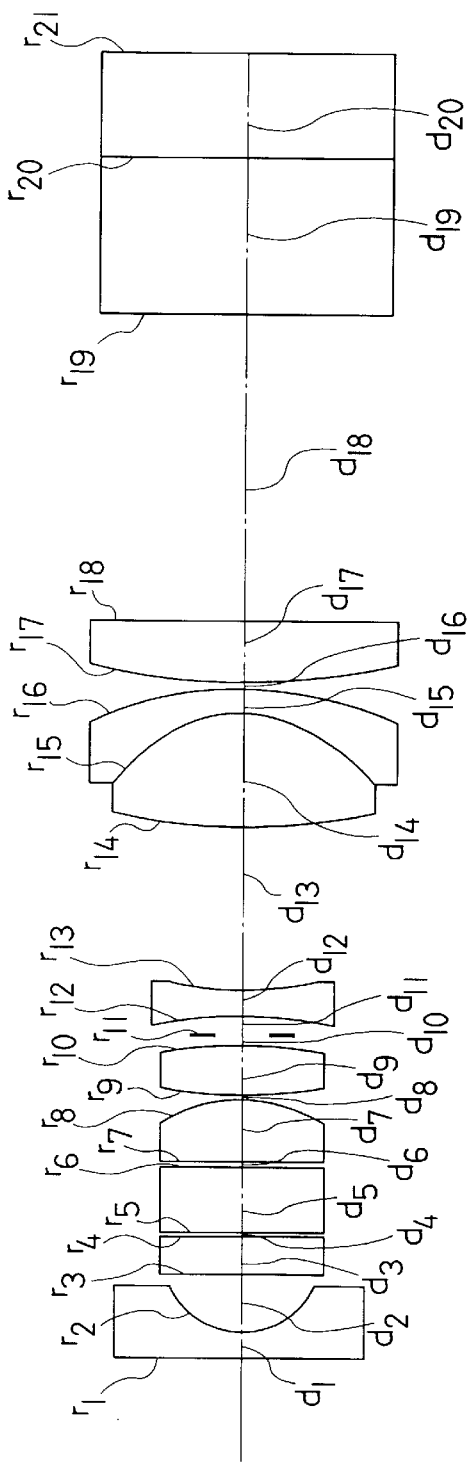
FIGS. 14A and 14B show sectional views illustrating a composition of an eleventh embodiment of the objective optical system according to the present invention.
Figure 14B:
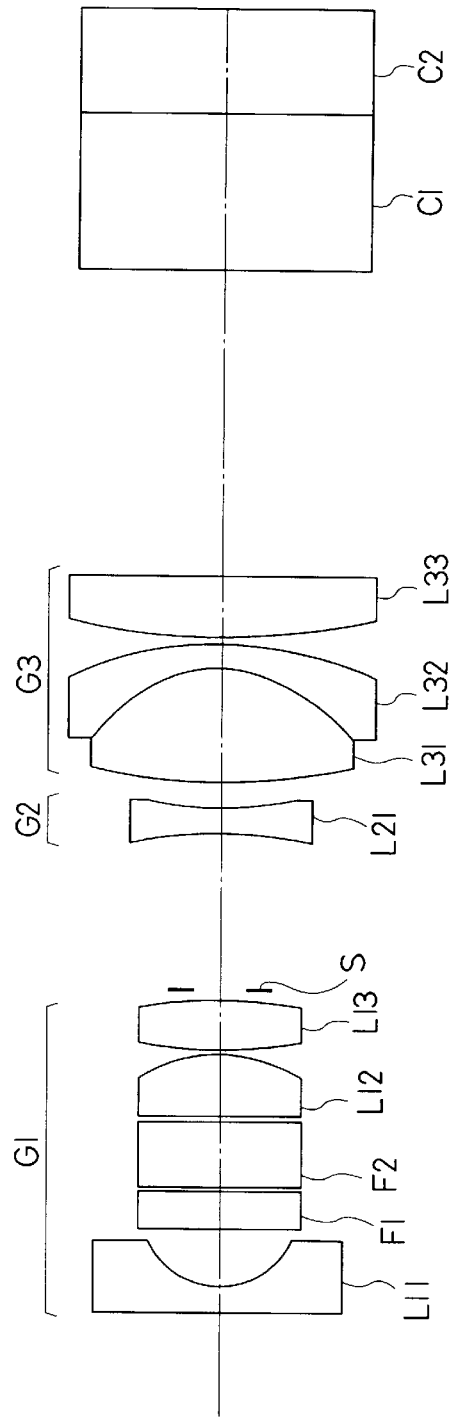

An optical system preferred as the eleventh embodiment of the present invention has a composition illustrated in FIG. 14A and FIG. 14B which correspond to a wide position and a tele position respectively.

The eleventh embodiment comprises, in order from the object side, a first lens unit G1 having a positive refractive power, a second lens unit G2 having a negative refractive power and a third lens unit G3 having a positive refractive power as shown FIGS. 14A and 14B.

The first lens unit G1 comprises, in order from the object side, a negative lens component L11, a positive lens component L12 and a positive lens component L13, the second lens unit G2 comprises a single negative lens component L21, and the third lens unit G3 comprises, in order from the object side, a cemented lens component consisting of a positive lens element L31 and a negative lens element L32, and a positive lens component L33.

The eleventh embodiment is also an optical system having a compact composition and favorable optical performance since it satisfies the conditions described above.

Furthermore, an aperture stop S is disposed between the first lens unit G1 and the second lens unit G2, and the two positive lens components are used in the first lens unit G1, thereby favorably correcting spherical aberration at the tele position and coma at the wide position.

Figure 15A:
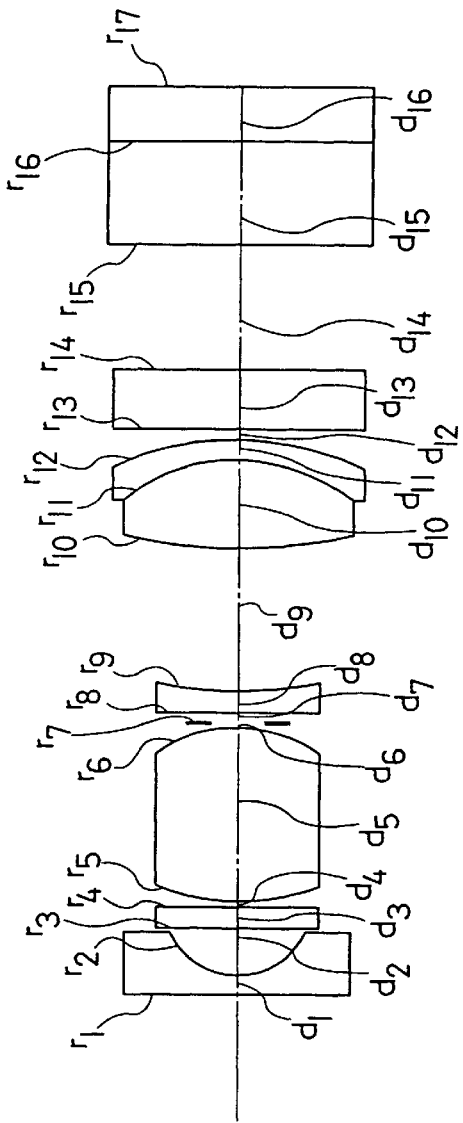
FIG. 15A and 15B show sectional views illustrating a composition of a twelfth embodiment of the objective optical system according to the present invention.
Figure 15B:
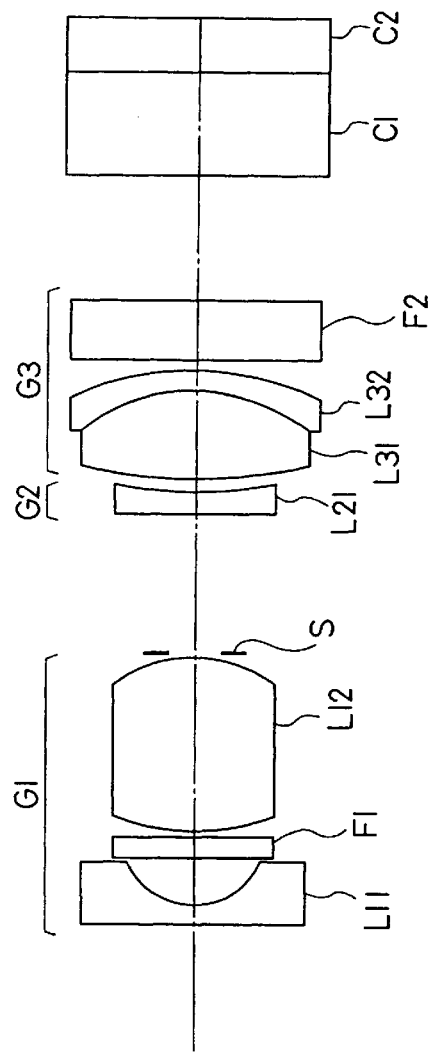

The twelfth embodiment of the present invention has a composition illustrated in FIG. 15A and FIG. 15B which correspond to a wide position and a tele position respectively.

An optical system preferred as the twelfth embodiment comprises, in order from the object side, a first lens unit G1 having a positive refractive power, a second lens unit G2 having a negative refractive power and a third lens unit G3 having a positive refractive power as shown in FIG. 15A and FIG. 15B. The first lens unit G1 comprises, in order from the object side, a negative lens component L11 and a positive lens component L12, the second lens unit G2 comprises a single negative lens component L21, and the third lens unit G3 comprises, in order from the object side, a cemented lens component consisting of a positive lens element L31 and a negative lens element L32. Furthermore, an aperture stop S is disposed between the first lens unit and the second lens unit.

In the sectional views illustrating all of the embodiments described above, a reference symbols C1 and C2 represent a dust-proof cover and a cover glass plate for an image pickup device such as a CCD like those used in the eight embodiment.

In the eighth embodiment, the flare stop FS which is disposed on the object side of the third lens unit G3 is located on the image side of a vertex of the object side convex surface $r_{14}$ of the third lens unit. Therefore, the airspace $d_{13}$ (a distance along the optical axis between the flare stop FS and the convex surface $r_{14}$) is a distance as measured from the image side toward the object side and specified with a minus sign (−) in the numerical data. Furthermore, a location of the flare stop FS ($r_{12}$) in the tenth embodiment is coincident with a vertex of the object side convex surface of the third lens unit and $d_{12}$ is specified as $d_{12}=0$ in the numerical data.

Figure 16A:
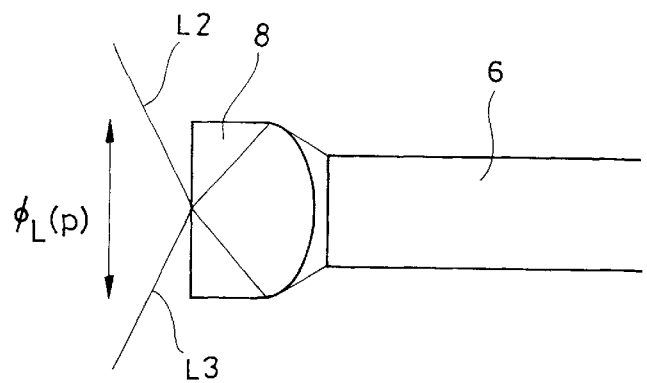
FIGS. 16A, 16B, 16C, 16D and 16E show sectional views illustrating illumination optical systems to be used in endoscopes according to the present invention.
Figure 16B:
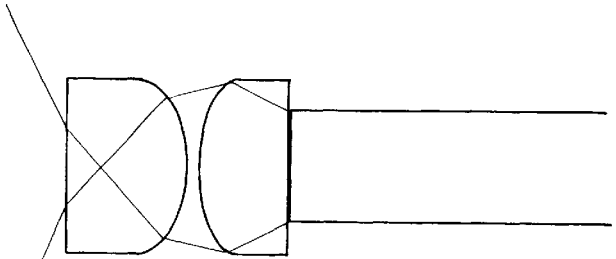
Figure 16C:
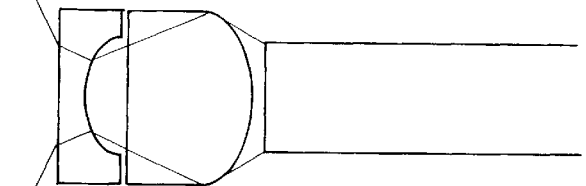
Figure 16D:
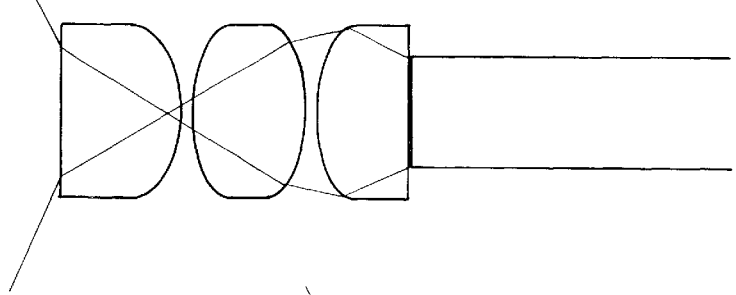

FIG. 16A, FIG. 16B, FIG. 16C and FIG. 16D show diagram exemplifying illumination optical systems which are to be used in combination with an objective optical system which permits observation of magnified images (the objective optical system according to the present invention). An optical system consisting of a single positive lens component is shown in FIG. 16A, an optical system consisting of two positive lens components is illustrated in FIG. 16B, an optical system consisting of a negative lens component and a positive lens component in order from the object side is presented in FIG. 16C, and an optical system consisting of three positive lens components is shown in FIG. 16D.

Each of the illumination optical systems shown in FIG. 16A, FIG. 16B, FIG. 16C and FIG. 16D is characterized in that it comprises at least a positive lens component and can have an outside diameter smaller than that of an optical system which is composed of a single negative lens component a shown in FIG. 2A. It is desirable to dispose a positive lens component on a side of a light guide as shown in FIGS. 16A, 16B, 16C or 16D. An illumination optical system which comprises a positive lens component on the side of a light guide as descried above can have a small outside diameter since the positive lens component converges a light bundle emerging from the light guide.

Figure 16E:
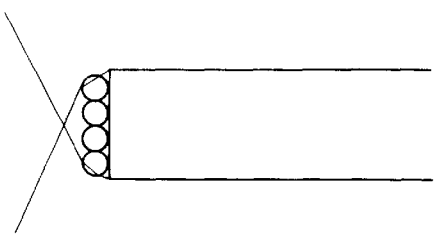

FIG. 16E shows an illumination optical system comprising a large number of spherical lens elements having a small diameter which are arranged before a light guide. This illumination optical system can have a small outside diameter and an extremely short total length.

Though the illumination optical systems shown in FIGS. 16A, 16B, 16C, 16D and 16E are assumed to have outer circumferential shapes which are circular, it is possible to configure the optical systems so as to have different outer circumferential shapes which are, for example, oval and rectangular sectional, thereby further reducing outside diameters of tip portions of endoscopes or making these portions more compact.

An endoscope system according to the present invention which is compact and has a small outside diameter can be obtained by combining the objective optical system according to the present invention exemplified by each of the embodiments of the present invention with any one of the illumination optical systems shown in FIGS. 16A, 16B, 16C, 16D and 16E.

The present invention is capable of providing an objective optical system which permits observation of magnified images, and nevertheless has a short total length and a small outside diameter. When the objective optical system according to the present invention is to be used in an endoscope, it can be combined with a compact illumination optical system, thereby composing a compact endoscope which has a small diameter.

What is claimed is:

1. An objective optical system comprising:
    a plurality of lens units; and
    an aperture stop disposed between a lens unit on a most object side and a lens unit disposed on a most image side of said plurality of lens units, wherein at least one of said lens units is moved along an optical axis for performing a vari-focal function and wherein said objective optical system satisfies the following condition (3):

$$0 < H_U/H_S < 0.8 \quad (3)$$

wherein the reference symbol $H_U$ represents a height of an offaxial upper ray at a location of the aperture stop and the reference symbol $H_S$ designates a radius of the aperture stop.

2. An objective optical system according to claim 1 satisfying the following condition (4):

$$0.1 < d_{OT}/f_T < 5 \quad (4)$$

wherein the reference symbol $d_{OT}$ represents an object distance at the tele position and the reference symbol $f_T$ designates a focal length of the objective optical system as a whole at the tele position.

3. An objective optical system comprising in order from the object side:
  a first lens unit having a positive refractive power said first lens unit consisting of a negative lens element and a positive lens element;
  a second lens unit having a negative refractive power; and
  a third lens unit having a positive refractive power, said third lens unit consisting of positive lens element and a negative lens element,
  wherein said second lens unit is moved along an optical axis for performing a vari-focal function and wherein said objective optical system comprises a cemented lens component.

4. An objective optical system comprising in order from the object side:
  a first lens unit having a positive refractive power;
  a second lens unit having a negative refractive power; and
  a third lens unit having a positive refractive power, wherein said second lens unit is moved along an optical axis for performing a vari-focal function, wherein said first lens unit comprises, in order from the object side, a negative lens component, a plane parallel plate, at least one optical element and an aperture stop, and wherein said objective optical system satisfies the following condition (5):

$$DDi < 0.2 \text{ mm} \quad (5)$$

wherein the reference symbol $DDi$ represents the shorter of an airspace $DD_1$ between the plane parallel plate and a most object side of said at least one optical element and airspace $DD_2$ between a most image side of said at least one optical element and the aperture stop.

5. An objective optical system according to claim 4, wherein said third lens unit comprises a positive lens element and a negative lens element.

6. An objective optical system according to claim 3 or 4 wherein an object distance at a wide position is shorter than an object distance at a telephoto position and wherein said objective optical system comprises at least a gradient index lens component made of a medium having a refractive index distribution.

7. An objective optical system according to claim 3, or 4, satisfying the following condition (1):

$$0.1 < |1/\{f_2(D_W - D_T)\}| < 2 \quad (1)$$

wherein the reference symbol $f_2$ represents a focal length of said second lens unit, and the reference symbols $D_W$ and $D_T$ designate airspaces reserved between the first lens unit and the second lens unit at the wide position and the tele position respectively.

8. An objective optical system according to claim 7 wherein a flare stop is disposed on an object side of the third lens unit and wherein said objective optical system satisfies the following condition (7):

$$0.1 \text{ mm} < \phi 3 \phi FS < 1.2 \text{ mm} \quad (7)$$

wherein the reference symbol $\phi FS$ represents an aperture diameter of the flare stop and the reference symbol $\phi 3$ designates a diameter of a lens component which has a smallest diameter in the third lens unit.

9. An objective optical system according to claim 4, or 5, satisfying the following condition (2)

$$1 < |(f_W \cdot f_T)^{1/2}/f_1| < 2 \quad (2)$$

wherein the reference symbol $f_1$ represents a focal length of the first lens unit, and the reference symbols $f_W$ and $f_T$ designate focal lengths of the objective optical system as a whole at the wide position and the tele position respectively.

10. An objective optical system comprising in order from the object side: a first lens unit having a positive refractive power; a second lens unit having a negative refractive power; and a third lens unit having a positive refractive power, wherein said second lens unit is moved along an optical axis for performing a vari-focal function, wherein a flare stop is disposed on the object side of the third lens unit, and wherein said objective optical system satisfies the following condition (7):

$$0.1 \text{ mm} < \phi 3 - \phi FS < 1.2 \text{ mm} \quad (7)$$

wherein the reference symbol $\phi FS$ represents an aperture diameter of the flare stop and the reference symbol $\phi 3$ designates a diameter of a lens component which has a smallest diameter in the third lens unit.

11. An objective optical system according to claim 10, wherein an object distance at a wide position is shorter than an object distance at a telephoto position and wherein said objective optical system comprises at least a gradient index lens component made of a medium having a refractive index distribution.

12. An objective optical system according to claim 10 satisfying the following condition (1):

$$0.1 < |1/\{f_2(D_W - D_T)\}| < 2 \quad (1)$$

wherein the reference symbol $f2$ represents a focal length of said second lens unit, and the reference symbols $D_W$ and $D_T$ designate airspaces reserved between the first lens unit and the second lens unit at a wide position and a telephoto position respectively.

13. An objective optical system according to claim 10 satisfying the following condition (2)

$$1 < |(f_W \cdot f_T)^{1/2}/f_1| < 2 \quad (2)$$

wherein the reference symbol $f_1$ represents a focal length of the first lens unit, and the reference symbols $f_W$ and $f_T$ designate focal lengths of the objective optical system as a whole at a wide position and a telephoto position respectively.

14. An objective optical system according to claim 1, 3, 4, or 10 satisfying the following condition (6):

$$1<|\beta_{2W}| \quad (6)$$

wherein the reference symbol $\beta_{2W}$ represents a magnification of the second lens unit at the wide position.

15. An objective optical system according to claim 3, 4, or 10, wherein the first lens unit comprises a negative lens component and a positive lens component, and wherein the third lens unit comprises a positive lens component and a negative lens component.

16. An objective optical system according to claim 1, 3, 4 or 10, having a field angle of 120° or wider.

17. An endoscope comprising:
  an objective optical system which comprises a plurality of lens units and moves at least a lens unit along an optical axis for performing a vari-focal function; and
  an illumination optical system which comprises at least a positive lens component,
  wherein said illumination optical system is constructed and arranged to illuminate a portion of a visual field of said objective optical system.

18. An endoscope according to claim 17, wherein said illumination optical system has a positive refractive power.

19. An endoscope according to claim 17, further comprising, a flare stop disposed between a lens unit on the most object side and a lens unit on a most image side.

20. An objective optical system which is used in combination with an illumination optical system comprising at least a positive lens component, wherein said illumination optical system consists of an optical element having a positive refracting power and is constructed and arranged to illuminate a portion of a visual field of said objective optical system.

21. An objective optical system comprising in order from the object side:
  a first lens unit having a positive refractive power;
  a second lens unit having a negative refractive power;
  a third lens unit having a positive refractive power; and
  a flare stop disposed on an object side of the third lens unit,
  wherein said second lens unit is moved along the optical axis for performing a vari-focal function and wherein said optical system satisfies the following conditions (1) and (2):

$$0.1<|1/\{f_2(D_W-D_T)\}|<2 \quad (1)$$

$$1<|(f_W \cdot f_T)^{1/2}/f_1|<2 \quad (2)$$

wherein the references symbols $f_1$ and $f_2$ represent focal lengths of the first lens unit and the second lens unit respectively, the reference symbols $D_W$ and $D_T$ designate airspaces reserved between the first lens unit and the second lens unit at a wide position and a telephoto position respectively, and the reference symbols $f_W$ and $f_T$ denote focal lengths of the objective optical system as a whole at the wide position and the telephoto position respectively.

22. An objective optical system comprising in order from the object side:
  a first lens unit having a positive refractive power;
  a second lens unit having a negative refractive power;
  a third lens unit having a positive refractive power; and
  a flare stop disposed on the object side of the third lens unit,
  wherein said first lens unit comprises a negative lens component and at least a positive lens component, and wherein said third lens unit comprises a negative lens component and at least a positive lens component.

23. An objective optical system comprising in order from the object side:
  a first lens unit having a positive refractive power;
  a second lens unit having a negative refractive power;
  a third lens unit having a positive refractive power; and
  a flare stop disposed on the object side of the third lens unit,
  wherein said second lens unit is moved along an optical axis for performing a vari-focal function and wherein said optical system comprises a cemented lens component.

24. An objective optical system comprising in order from the object side:
  a first lens unit having a positive refractive power;
  a second lens unit having a negative refractive power; and
  a third lens unit having a positive refractive power,
  wherein said second lens unit is moved along an optical axis for performing a vari-focal function and wherein said optical system satisfies the following conditions (1), (2) and (6):

$$0.1<|1/\{f_2(D_W-D_T)\}|<2 \quad (1)$$

$$1<|(f_W \cdot f_T)^{1/2}/f_1|<2 \quad (2)$$

$$1<|\beta_{2W}| \quad (6)$$

wherein the reference symbol $f_2$ represents a focal lengths of the second lens unit respectively, the reference symbols $D_W$ and $D_T$ designate airspaces reserved between the first lens unit and the second lens unit at a wide position and a tele position position respectively, the reference symbols $f_W$ and $f_T$ denote focal lengths of the objective optical system as a whole at the wide position and the telephoto position respectively, and the reference symbol $\beta_{2W}$ represents a magnification of the second lens unit at the wide position.

25. An objective optical system comprising in order from the object side:
  a first lens unit having a positive refractive power;
  a second lens unit having a negative refractive power; and
  a third lens unit having a positive refractive power,
  wherein said first lens unit comprises a negative lens component and at least a positive lens component, wherein said third lens unit comprises a negative lens component and at least a positive lens component, and wherein said objective optical system satisfies the following condition (1):

$$0.1<|1/\{f_2(D_W-D_T)\}|<2 \quad (1)$$

wherein the reference symbol $f_2$ represents a focal length of said second lens unit, and the reference symbols $D_W$ and $D_T$ designate airspaces reserved between the first lens until and the second lens unit at a wide position and a tele position respectively.

26. An objective optical system according to claim 25, wherein a flare stop is disposed on the object side of the third lens unit and wherein said objective optical system satisfies the following condition (7):

$$0.1\ mm<\phi 3-\phi FS<1.2\ mm \quad (7)$$

wherein the reference symbol ϕFS represents an aperture diameter of the flare stop and the reference symbol ϕ3 designates a diameter of a lens component which has a smallest diameter in the third lens unit.

27. An objective optical system comprising in order from the object side:

a first lens unit having a positive refractive power;

a second lens unit having a negative refractive power; and a third lens unit having a positive refractive power, wherein said first lens unit comprises a negative lens component and at least a positive lens component, wherein said third lens unit comprises a negative lens component and at least a positive lens component, and said objective optical system satisfies the following condition (2):

$$1 < |(f_W \cdot f_T)^{1/2}/f_1| < 2 \qquad (2)$$

wherein the reference symbol $f_1$ represents a focal length of the first lens unit, and the reference symbols $f_W$ and $f_T$ designate focal lengths of the objective optical system as a whole at the wide position and the telephoto position respectively.

28. An objective optical system comprising in order from the object side:

a first lens unit having a positive refractive power;

a second lens unit having a negative refractive power; and a third lens unit having a positive refractive power, wherein said second lens unit is moved along an optical axis for performing a vari-focal function, wherein said objective optical system comprises a cemented lens component, wherein a flare stop is disposed on the object side of the third lens unit and wherein said objective optical system satisfies the following conditions (1) and (7):

$$0.1 < |1/\{f_2(D_W - D_T)\}| < 2 \qquad (1)$$

$$0.1\text{ mm} < \phi 3 - \phi FS < 1.2\text{ mm} \qquad (7)$$

wherein the reference symbol $f_2$ represents a focal length of said second lens unit, the reference symbols $D_W$ and $D_T$ designate airspaces reserved between the first lens unit and the second lens unit at a wide position and a telephoto position respectively, the reference symbol ϕFS denotes an aperture diameter of the flare stop and the reference symbol ϕ3 represents a diameter of a lens component which has a smallest diameter in the third lens unit.

29. An objective optical system comprising in order from the objective side:

a first lens unit having a positive refractive power;

a second lens unit having a negative refractive power; and a third lens unit having a positive refractive power, wherein said second lens unit is moved along an optical axis for performing a vari-focal function and wherein said objective optical system has a field angle of 120° or wider and satisfies the following conditions (1) and (2):

$$0.1 < |1/\{f_2(D_W - D_T)\}| < 2 \qquad (1)$$

$$1 < |(f_W \cdot f_T)^{1/2}/f_1| < 2 \qquad (2)$$

wherein the reference symbols $f_1$ and $f_2$ represent focal lengths of the first lens unit and the second lens unit respectively, the reference symbols $D_W$ and $D_T$ designate airspaces reserved between the first lens unit and the second lens unit at a wide position and a telephoto position respectively, and the reference symbols $f_W$ and $f_T$ denote focal lengths of the objective optical system as a whole at the wide position and the telephoto position respectively.

30. An objective optical system comprising in order from the object side:

a first lens unit having a positive refractive power;

a second lens unit having a negative refractive power; and a third lens having a positive refractive power, wherein said first lens unit comprises a negative lens component and at least a positive lens component, wherein said third lens unit comprises a negative lens component and at least a positive lens component, and wherein said objective optical system has a field angle of 120° or wider.

* * * * *